United States Patent [19]
Urano

[11] Patent Number: 5,990,898
[45] Date of Patent: Nov. 23, 1999

[54] MULTI-MEDIA DATA DISPLAY DEVICE

[75] Inventor: Naoki Urano, Osaka, Japan

[73] Assignee: Sharp Kabushiki Kaisha, Osaka, Japan

[21] Appl. No.: 08/818,902

[22] Filed: Mar. 17, 1997

[30] Foreign Application Priority Data

Mar. 18, 1996 [JP] Japan .................................. 8-061533

[51] Int. Cl.$^6$ .................................................. G06F 15/00
[52] U.S. Cl. ...................................................... 345/426
[58] Field of Search ..................................... 345/329, 420, 345/421, 428, 426; 395/126, 119, 131, 143; 128/653.4; 340/703; 364/518; 434/42

[56] References Cited

U.S. PATENT DOCUMENTS

| | | | |
|---|---|---|---|
| 4,313,726 | 2/1982 | Chase .......................................... | 434/42 |
| 4,866,637 | 9/1989 | Gonzalez-Lopez et al. ............. | 364/518 |
| 5,063,375 | 11/1991 | Lien et al. ................................ | 340/703 |
| 5,237,650 | 8/1993 | Priem et al. .............................. | 395/143 |
| 5,368,033 | 11/1994 | Moshfeghi ............................ | 128/653.4 |
| 5,598,516 | 1/1997 | Mori .......................................... | 395/126 |
| 5,704,025 | 12/1997 | Berry ......................................... | 395/131 |
| 5,751,927 | 5/1998 | Wason ....................................... | 395/119 |

OTHER PUBLICATIONS

Foley et al, "Computer Graphics Principles and practice", Illumination Models2nd Edition, p. 727 1990.

*Primary Examiner*—Matthew Luu
*Assistant Examiner*—Jeff Piziali
*Attorney, Agent, or Firm*—Nixon & Vanderhye P.C.

[57] ABSTRACT

A multi-media data display device for displaying a plurality of multi-media data items on a display screen is provided. Each of the multi-media data items has geometric data and attributive data defined by positional information in an n-dimensional space. The multi-media data display device includes: a view area setting section for setting a view area from a multi-media data space, in which the plurality of multi-media data items exist, based on access position information having a predetermined dimension, the view area having been selected as including at least one of the plurality of multi-media data items as an object to be displayed, the access position information having been produced within the multi-media data display device or provided from the outside of the multi-media data display device, and a display control section for independently controlling, based on the access position information, a display style of an individual one of the plurality of multi-media data items existing within the selected view area when the individual multi-media data item is displayed on the display screen.

6 Claims, 20 Drawing Sheets

|u| = V·W

MULTI-MEDIA DATA DISPLAY DEVICE

BACKGROUND OF THE INVENTION

1. Field of the Invention

The present invention relates to a multi-media data display device, and more specifically to a multi-media display device for defining the display styles of an individual object to be displayed by a function in a one-dimensional or multi-dimensional data space in which multi-media data associated with the object exist and displaying the individual object by independently varying the display styles thereof based on the positional coordinates in the data space.

2. Description of the Related Art

First, three-dimensional viewing commonly used for multi-media data display processing will be briefly described.

Three-dimensional viewing is a process for displaying an individual solid-state display object on a two-dimensional display screen of a display device based on the geometric data specifying the individual object. The geometric data is represented by the positional coordinates of the object in a three-dimensional space.

FIG. 15 is a chart diagrammatically illustrating the process flow executed in the three-dimensional viewing.

As shown in FIG. 15, the three-dimensional viewing roughly includes the following four process steps: a clipping process step (Step S11) with respect to a view volume; a projection process step (Step S12) onto a projection plane; a transformation process step for obtaining a viewport at the normalized coordinates (Step S13); and a transformation process step (Step S14) for obtaining the coordinates for a physical (display) device. Hereinafter, the processes executed in the respective process steps S11 through S14 will be described.

The clipping process step S11 executed with respect to a view volume is a process for specifying, a three-dimensional visible field based on predetermined conditions when the location of a view point and a viewing direction are set (in this specification, the "view point" means a point from which viewer's eyes are turned onto an object and the "viewing direction" means a direction in which the viewer's eyes are turned onto the object). A view volume is selectively defined from such a three-dimensional visible field.

The projection process step S12 is a process step for transforming the points composing an individual object existing within the view volume into the points on a two-dimensional view coordinate space Hv (i.e., a projection plane).

Hereinafter, these process steps will be specifically described.

FIG. 16 is a diagram for illustrating the clipping process with respect to the view volume and the projection process for the objects existing within the view volume. FIG. 16 shows a three-dimensional space in which a plurality of objects exist (such a space will also be referred to as an "object space"). Herein, a "projection" is a process for transforming the points composing a solid-state object in a three-dimensional space into the points on a two-dimensional view coordinate space (i.e., a projection plane).

In FIG. 16, "3D" refers to a three-dimensional viewing coordinate system including x-, y- and z-coordinates and corresponding to the two-dimensional display screen (hereinafter, simply referred to as a "screen") of a physical (display) device. In this 3D coordinate system, the x-axis direction corresponds to a direction extending to the right of the screen, the y-axis direction corresponds to a direction extending to the top of the screen and the z-axis direction corresponds to a direction extending to the depth of the screen. Herein, the coordinates of a view point Ps within the viewing coordinate system (i.e., data access coordinates to be described later) are assumed to specify the coordinates (x0, y0, z0) of the origin of the 3D viewing coordinate system, and the direction in which a viewer looks from the view point Ps into the viewing coordinate system (hereinafter, such a direction will be referred to as a "viewing direction") is assumed to be the z-axis direction of the 3D viewing coordinate system and be represented by a direction vector w (i.e., a data access vector to be described later).

In FIG. 16, when the viewer looks from the view point Ps into the screen along the direction indicated by the direction vector w, five objects OB1 to OB5 are located within a visible field Rs and two more objects OB6 and OB7 are located outside of the visible field Rs. Herein, the visible field Rs is a pyramidshaped spatial domain defined by the one-dot chains in FIG. 16. Since the respective objects OB1 to OB7 exist within the 3D viewing coordinate system, the geometric data specifying an individual object are given by the (x, y, z) coordinates of the points composing the individual object.

In the three-dimensional viewing process, all the objects included within the visible field Rs are not to be displayed. Rather, a process for setting an area including the desired objects to be displayed is required to be performed. Such a process is the above-mentioned clipping process with respect to the view volume in the process step S11.

More specifically, a boundary plane Hf (or a front clipping plane) closer to the viewer and another boundary plane Hb (or a rear clipping plane) more distant from the viewer are set, while assuming the view point Ps as a reference point such that both planes are vertical to the viewing direction indicated by the direction vector w. Then, the objects OB2 to OB4 included within the spatial domain Rv (hereinafter, such a specified domain of the view volume will be referred to as a "view area") interposed between the two clipping planes Hf and Hb within the visible field Rs are selected as the objects to be displayed. It should be noted that the objects OB1 and OB5 are certainly included within the visible field Rs but are excluded from the view area Rv and located outside the view area Rv. Thus, in this case, the objects OB1 and OB5 are not selected as objects to be displayed.

A center projection process producing visual effects similar to those produced by a photographing system or a visual sensing system of a man may be suitably employed as the projection process as one of the process steps of the three-dimensional viewing. Hereinafter, such a center projection will be described.

In this center projection process, first, the view point Ps is assumed to be the center of projection in the visible field Rs shown in FIG. 16. Next, a projection plane (or a view plane) Hv which is distant from the center of projection Ps by a predetermined distance and is vertical to the z-axis is defined. Then, the objects OB2 to OB4 located within the view area Rv are projected onto the projection plane Hv. In other words, this is a process for transforming the points composing the three-dimensional objects OB2 to OB4 located within the view area Rv into the points on a two-dimensional viewing coordinate space (i.e., the projection plane) Hv. This process is accomplished based on a proportional calculation using the specific distances from the center of projection Ps to the points composing the individual object and the distance from the center of projection Ps to the view plane Hv.

Next, the processes executed in the process steps S13 and S14 will be described.

FIG. 17 is a diagram illustrating a process for transforming a point (or a pixel) Phv on the projection plane (or the view coordinate plane) Hv into a pixel Phd on a display screen of a physical device via a point Phs within a viewport Vp on a normalized coordinate plane Hs in the three-dimensional viewing process.

As shown in FIG. 17, first, in the process step S13, a point Phv on the projection plane (or the view coordinate plane) Hv is transformed into a point Phs within the viewport Vp on the normalized coordinate plane Hs. Herein, the viewport Vp is a zone defined as a part of the normalized coordinate plane Hs and has the same aspect ratio as that of the projection plane Hv.

Next, in the process step S14, the point Phs on the normalized coordinate plane Hs is transformed into a point Phd on a physical device coordinate plane Hd, which corresponds to the screen of a display device.

The coordinate transformations performed as the process steps S13 and S14 establishes a correspondence between a point (i.e., the pixel Phv) which has been projected onto the view coordinate plane (or the projection plane) as an integral part of a resulting solid-state object (i.e., a 3D object) and one of the points (i.e., the pixel Phd) composing the display screen of the display device. As a result, a 3D object (or an object having geometric data given by coordinates in a three-dimensional space) can be displayed on the display screen of (the 2D display) of the display device.

Hereinafter, a conventional multi-media data display method for effectively performing a display process on three-dimensional graphics (J. D. Folley, A. van Dam, "Computer Graphics Principles and Practice", 2nd edition, Addison-Wesley Publishers Co., pp. 727–728, 1990) will be briefly described.

Such a method is called a "depth cuing" for controlling the display of graphics. The depth cuing is generally used for effectively enhancing the perspective perception of an object. This is a method for enhancing the perspective perception of an object to be displayed by setting the display color depth of the object depending upon the distance from the view point Ps to the view area where the object is located in the three-dimensional viewing process such that the more distant object is displayed in the lighter color.

Such a depth cuing method controls the display styles of an object based on the view parameters. Thus, the data of the object to be displayed such as geometric data and attributive data is not directly associated with the display control by means of the depth cuing.

As described above, in accordance with a conventional multi-media data display control method, a display control is performed primarily based on a view control, i.e., by setting the visual appearance (or the display styles) of an object in accordance with an individual view area. It is noted that a view area in a three-dimensional space exactly corresponds to the finder of a camera. Thus, controlling an object in accordance with the individual view area corresponds to controlling the imaging state of an object to be photographed based on the light incident from the object by providing a filter for the lens of the camera.

Accordingly, in a conventional display control method, the visual appearance of all the objects located within the view area is determined by the parameters (or the variables) of the view area and the geometric data and the attributive data specifying the objects. For example, if the view point moves, then all the objects (including important ones and unimportant ones) within a view area becomes smaller (or the color thereof becomes lighter) or larger (or the color thereof becomes deeper).

Next, a navigation system will be described as an exemplary specific application of a conventional display control method using the depth cuing.

FIG. 18 is a block diagram illustrating a conventional navigation system. As shown in FIG. 18, the conventional car navigation system includes a car navigator apparatus 500 and a display 540. The car navigator apparatus 500 includes: an object database 530 in which the data of all the objects OB1 through OBn to be displayed by this system are stored; a view variation detector 520 for detecting the variation in view parameters; and a display controller 510 for controlling the display of the objects on the display 540 based on the data stored in the object database 530 in response to the detection output of the view variation detector 520.

In the object database 530, an ID table for all objects 530a (hereinafter, such a table will be simply referred to as an "ID table"), on which the basic data D1 to Dn including the geometric data specifying the shapes and the positions of all the objects OB1 through OBn to be displayed and the attributive data specifying various attributes thereof such as a color are written so as to correspond to all the objects OB1 through OBn, is stored.

The view variation detector 520 includes a view point movement detection section 521 for detecting the movement of the view point position (i.e., in this case, the movement of a car) and a viewing direction detection section 522 for detecting the variation of the viewing direction (i.e., in this case, the variation of the travelling direction of the car).

The display controller 510 includes a data storage section 511 for temporarily storing therein the basic data of the objects to be displayed at a point in time when the car is at a predetermined location and on the point of proceeding in a predetermined direction. In the data storage section 511, a display object table (hereinafter, simply referred to as an "S table") 511a for writing thereon the basic data of the objects so as to correspond to the respective objects has been formed. The display controller 510 further includes a data retrieving section 512 for reading out the basic data of the objects included within the view area Rv (see FIG. 16), i.e., the basic data of the objects to be displayed in accordance with the currently detected location and travelling direction of the car, from the ID table 530a of the object database 530 in accordance with the location of the view point detected by the view point movement detection section 521 and the viewing direction detected by the viewing direction detection section 522, and then writing the basic data onto the S table 511a of the data storage section 511.

The display controller 510 further includes a display data calculation section 513 for calculating the display data I' from the basic data D stored in the S table 511a in accordance with the location and the travelling direction of the car which have been detected by the view variation detector 520, and also includes a display control section 514 for controlling the display of the objects on the display 540 based on the display data I' calculated by the display data calculation section 513.

Next, the operation of the car navigation system will be described.

In this case, a road sign OB2 indicating a speed limit of 100 km/h (hereinafter, simply referred to as a "speed-limit sign") and a road sign OB5 indicating no parking (hereinafter, simply referred to as a "no-parking sign") are employed as the objects to be displayed. A display control operation performed by the car navigation system for displaying these road signs OB2 and OB5 as objects on the display 540 will be described below. FIG. 19 shows the road signs OB2 and OB5 which are displayed on the display 540 in various sizes along the movement of the car and a graph $\alpha_0$ showing the relationship between the normalized sizes of these road signs and the locations of the car.

In the graph shown in FIG. 19, the axis of the ordinates indicates the size ρ of the road sign object displayed on the display screen, while the axis of the abscissas indicates the distance x from the reference location (i.e., the origin of the coordinate system) and the current location of the travelling car.

As shown in FIG. 19, when the car is located far away from the spot where the road signs OB2 and OB5 are disposed, these road sign objects are displayed in such small sizes that the sign objects $OB2_1$ and $OB5_1$ at this point in time are hardly visible to a viewer. However, as the car comes closer to the spot (i.e., x=2.0) where these road signs are disposed, the sizes of these road sign objects displayed on the display screen gradually increase, i.e., $OB2_1 \rightarrow OB2_2 \rightarrow OB2^S$, and $OB5_1 \rightarrow OB5_2 \rightarrow OB5_S$. Finally, once the car has passed the spot in question, the road sign objects are no longer displayed on the display screen. That is to say, OB2 become $OB2_0$ and OB5 becomes $OB5_0$.

Next, a display process for varying the display styles of the road sign objects on the display screen in accordance with the movement of the car will be described.

FIG. 20 is a flow chart illustrating this process flow.

In Step S1, the data retrieving section 512 waits for the movement of the view point position or the variation of the viewing direction to be detected by the view variation detector 520. When the movement of the view point position or the variation of the viewing direction is detected, the data retrieving section 512 updates the S table 511a in the display controller 510.

More specifically, the data retrieving section 512 retrieves the basic data of the objects OB2 and OB5 which have been included within the view area at the point in time from the ID table 530a of the object database 530, writes the basic data onto the S table 511a in the display controller 510 and then eliminates the basic data of the objects which have been excluded from the view area at the point in time from the S table 511a (Step S2).

In the case of performing the display control of the road signs as described with reference to FIG. 19, when the car reaches the location where x=1, the basic data D2 and D5 of the speed-limit sign object OB2 and the no-parking sign object OB5 are written onto the S table 511a as the objects which have been included within the view area and the basic data of the other objects are eliminated from the S table 511a.

Next, the display data calculation section 513 calculates the display data I'2 and I'5 of the objects OB2 and OB5 stored in the S table 511a of the data storage section 511 based on the basic data D2 and D5 thereof, in response to the detection output of the view variation detector 520 (Step S3). More specifically, the display data calculation section 513 determines whether or not there are any objects in the S table 511a of the storage section 511 which are yet to be processed for calculating the display data based on the basic data. If there are any objects in question, then the display data calculation section 513 temporarily retrieves the basic data D of the objects from the S table 511a (Step S3a), produces the display data I' by processing the basic data D by predetermined arithmetic processing (Step S3b) and then writes the display data I' onto the S table 511a. When there no longer exist in the S table 511a any objects yet to be processed for calculating the display data I' based on the basic data D, the display control section 514 provides the display data I'2 and I'5 of the respective objects OB2 and OB5 stored in the S table 511a to the display 540 (Step S4).

As a result, the objects OB2 and OB5 are displayed on the display 540 in accordance with the outputs of the view variation detector 520 at the point in time, i.e., the current location and travelling direction of the car.

For example, in the case of performing the display control of the speed-limit sign object OB2 and the no-parking sign object OB5 shown FIG. 19, the road sign objects OB2 and OB5 are displayed on the display 540 in the variable sizes (i.e., $OB2_1 \rightarrow OB2_2 \rightarrow OB2_S \rightarrow OB2_0$ and $OB5_1 \rightarrow OB5_2 \rightarrow OB5_S \rightarrow OB5_0$) corresponding to the outputs of the view variation detector 520, i.e., the locations and travelling directions of the car.

Thereafter, it is determined whether or not the display control is to be continued (Step S5). If it is to be continued, the process by the display controller 510 returns to Step S1. On the other hand, if it is not to be continued, the display controller 510 ends the process.

However, when a display control is performed in accordance with a conventional depth cuing method as in the above-described navigation system, the display styles of an object on the display screen are determined depending upon the view variables, e.g., where the view point is located.

In other words, in accordance with the conventional technologies, a display control corresponding to a specific view area determined by the location of the view point and the like is commonly performed with respect to the objects to be displayed. Thus, it is impossible to independently control the display styles of the individual objects on the display screen.

Therefore, in accordance with the conventional technologies, since the depth cuing control must be performed on the basis of the view area, an independent depth cuing control cannot be applied to an individual object in a specific view area. Consequently, in the example shown in FIG. 19, it is impossible to independently control the display styles (or the display sizes) of the speed-limit sign object OB2 and the no-parking sign object OB5. This means that it is very difficult to simultaneously display a large quantity of multi-media data (or objects) effectively.

In order to eliminate such a disadvantage, a method has been developed for independently controlling the display styles of a plurality of objects displayed on the display screen. According to this suggested method, not only basic data but also a flag are set for each object. Even when an object is located within a view area, it is determined based on the value of the flag thereof whether or not the object is to be displayed.

Hereinafter, such a method will be specifically described as being applied to a case where an object to be displayed is a road sign.

In this case, flags associated with the temperature are set with respect to the individual objects to be displayed. For example, if the objects to be displayed are a speed-limit sign, a no-parking sign and "Slippery when wet" sign (hereinafter, simply referred to as a "slip-sign"), the flag of the slip-sign object is assumed to be "1" when the temperature is 0° C. or lower and to be "0" when the temperature is higher than 0°

C. The flags of the other road sign objects are assumed to be always "1" irrespective of the temperature.

For example, assuming that the car is now located at a position within a view area where all of the speed-limit sign, no-parking sign and slip-sign objects exist, all the road sign objects are automatically displayed in the case of the above-described conventional depth cuing control method unless the flags have been set. However, in the case where the flag corresponding to the temperature has been set, when the temperature is higher than 0° C., the value of the flag associated with the slip-sign object is "0", so that only the speed-limit sign object and the no-parking sign object are displayed on the display screen.

However, in this method, the flag set for an object is not defined by a continuous function with respect to the temperature. Generally speaking, in a display control method using such a flag, it is not defined by a continuous function with respect to three-dimensional spatial coordinates and other variables whether or not an object existing in a view area is visible (hereinafter, referred to as "object visibility"). For example, when a flag associated with the object visibility is set, if an object is located within a view area, only the visibility of the object is acknowledged, but the display style of the object is invariable. Thus, since such a flag-based display control is a discontinuous one where the flag has only two values of "0" and "1", it is impossible to continuously vary the display styles of an object directly in accordance with the parameters (including the three-dimensional spatial coordinates thereof) and other variables in a view area.

To sum up, in a conventional multi-media data display device, since the display style (or the visual appearance) of an object on a display screen of a display device is controlled based on the relationship between the basic data of the object (i.e., the geometric data and the attributive data specifying the object) and the parameters in the view area, such a device can perform nothing but a very simple display control in accordance with an individual view area.

On the other hand, even in a display control method based on the logical operations of a flag or the like which has been set for an object, as well as the relationship between the basic data and the parameters in a view area, the independent display control for the individual objects is nothing but a discontinuous simple one relying only on the visibility of each of the objects which is represented as one of the two flag values of "0" and "1". Thus, in accordance with such a conventional method, it is impossible to smoothly and flexibly control the display styles of a plurality of objects displayed on the display screen on an object basis.

SUMMARY OF THE INVENTION

According to the present invention, a multi-media data display device for displaying a plurality of multi-media data items on a display screen is provided. Each of the multi-media data items has geometric data and attributive data defined by positional information in an n-dimensional space. The multi-media data display device includes: view area setting means for setting a view area from a multi-media data space, in which the plurality of multi-media data items exist, based on access position information having a predetermined dimension, the view area having been selected as including at least one of the plurality of multi-media data items as an object to be displayed, the access position information having been produced within the multi-data display device or provided from the outside of the multi-data display device; and display control means for independently controlling, based on the access position information, a display style of an individual one of the plurality of multi-media data items existing within the selected view area, when the individual multi-media data item is displayed on the display screen.

According to another aspect of the present invention, a multi-media data display device for displaying a plurality of solid-state objects on a display screen based on basic component data specifying the objects is provided. The multi-media data display device includes: a database for storing display control data setting a display style of an individual one of the objects on the display screen, as well as the basic components data of the object; view area setting means for setting a view area from an object space, in which the plurality of objects exist, based on data access position information having a predetermined dimension, the view area having been selected as including at least one of the plurality of objects to be displayed, the data access position information having been produced within the multi-data display device or provided from the outside of the multi-data display device; and data calculating means for calculating display style data, representing the display style of the individual one of the objects existing within the selected view area, from a display style data position to be determined by the data access position information in a one-dimensional or multi-dimensional display style data space where the display style data exists, based on function data used as display control data for defining a correspondence between the display style data position and the display style data. In the multi-media data display device, the display style of the individual object, existing within the view area, on the display screen is independently controlled in accordance with the data access position information.

In one embodiment, the display style of the individual object is set by a plurality of factors including a display size and a display color depth of the object displayed on the display screen. The display style data is defined for each of the plurality of factors in a display style data space provided for each of the factors. The display style data space each includes: respective dimensions of the object space where the objects exist; a dimension corresponding to a direction vector in the object space; and dimensions respectively corresponding to a time, a temperature and a humidity. The display control data is comprised of a number of function data for defining a relationship between the display style data corresponding to the plurality of factors setting the display style of the object and the position of the display style data in the display style data space, the number of the function data corresponding to the number of the factors.

In another embodiment, the data access position information includes a data access vector providing directional information of the individual object in the object space. The data calculation means calculates display data representing the individual object based on the display style data. The display data is defined by a display transformation function using, as a first variable, a display parameter which is a constant value specific to the individual object and, as a second variable, a scale factor which is a product of the display style data corresponding to the factors and an intensity constant indicating to what degree the display style data is affected on the display screen. The intensity constant is defined by an intensity factor function using, as a variable, an inner product of an intensity normal vector indicating a dependence direction of the display style data and the data access vector in the object space, the intensity normal vector being defined for the individual object by an intensity normal vector transformation function using the display style data position in the display style data space as a variable.

Hereinafter, the functions or the effects to be attained by the present invention will be described.

According to the present invention, in displaying, on a display screen, multi-media data items which have been selected as objects to be displayed and exist within a view area within a multi-media space, the display styles of an individual multi-media data item is controlled based on the data access position information which has been produced within the multi-data display device or has been provided from the outside of the multi-data display device. As a result, it is possible to smoothly and flexibly vary the display styles of an individual one of the multi-media data items displayed on a two-dimensional display screen.

In addition, according to the present invention, the display style data representing the display styles for an individual one of the objects to be displayed which exist in the view area within the object space is calculated from the position of the display style data to be determined by the data access position information in a one-dimensional or multi-dimensional display style data space where the display style data exists, based on function data used as display control data for defining a correspondence between the display style data position and the display style data. As a result, the display styles of an individual one of the objects existing within the view area can be independently varied on the display screen in accordance with the display style data position in the display style data space. Thus, multi-media data items as objects can be effectively displayed in real-time.

Moreover, according to the present invention, the display control data consists of a number of function data for defining a correspondence between the display style data corresponding to a plurality of factors setting the display styles of an object and the display style data position in the display style data space where the display style data exists such that the number of the function data corresponds to the number of the factors. As a result, the display styles of the object can be appropriately set by a function using the coordinates in the display style data space as a variable.

Furthermore, according to the present invention, the data access position information is assumed to include a data access vector providing the directional information of an individual object in the object space, and the intensity constant indicating to what degree the display style data corresponding to the factors has been affected on the display screen is defined by an intensity factor function using, as a variable, the inner product of an intensity normal vector indicating a dependence direction of the display style data and the data access vector. As a result, the display styles of the object on the display screen can be varied depending upon the viewing direction, i.e., the direction along which the viewer looks into the screen.

Thus, the invention described herein makes possible the advantage of providing a multi-media data display device allowing for smoothly and flexibly varying the display styles of a plurality of 3D or 2D objects, which have been displayed on a 2D display screen based on the basic data specifying the respective objects as being located within a view area, on an object basis and in accordance with the basic data and the parameters in the view area.

This and other advantages of the present invention will become apparent to those skilled in the art upon reading and understanding the following detailed description with reference to the accompanying figures.

BRIEF DESCRIPTION OF THE DRAWINGS

FIG. 1A is a perspective view showing the hardware configuration of the display device, while FIG. 1B is a block diagram illustrating the functions of the respective components of the display device.

FIG. 2A shows the graph of a function $\rho_a = f_a(x)$ represented by Equation 3; FIG. 2B shows the graph of a function $\rho_b = f_b(x)$ represented by Equation 4; and FIG. 2C shows the inner product of a data access vector w and an intensity normal vector v.

FIG. 6A shows how the navigator apparatus is installed in a car body and FIG. 6B shows how navigation information is displayed by the navigator apparatus on the front glass of the car.

FIG. 8A is a graphic representation showing a graph representing an intensity distribution function defined with respect to the speed-limit road sign object OB2, while

FIG. 9A is a graphic representation showing a graph $\alpha_A$ representing a function $f_A(x)$ defining the relationship between a display size (intensity value) $\rho_A$ and a positional coordinate (location of a view point) x in the data space and a graph $\alpha_B$ representing a function $f_B(x)$ defining the relationship between the display color depth (intensity value) $\rho_B$ and the positional coordinate (location of the view point) x in the data space, while FIG. 9B is a table showing the correspondence between the positional coordinates $x_1$ and $x_2$ in the data space and the display sizes $A_1$ and $A_2$ and the display color depths $B_1$ and $B_2$ corresponding to the respective coordinates, along with the relations representing the functions $f_A$ and $f_B$.

FIGS. 13A through 13C are schematic representations showing the appearance of a small-sized electronic unit including the multi-media data display device in the third example of the present invention for providing the information, about an exhibit, a product for sale or the like:

FIG. 13A shows a state where the protective cover attached to the body of the small-sized electronic unit is opened; FIG. 13B shows a state where the cover is closed; and FIG. 13C shows a state where the protective cover is folded back to the rear side of the unit.

DESCRIPTION OF THE PREFERRED EMBODIMENTS

Figure 1A:
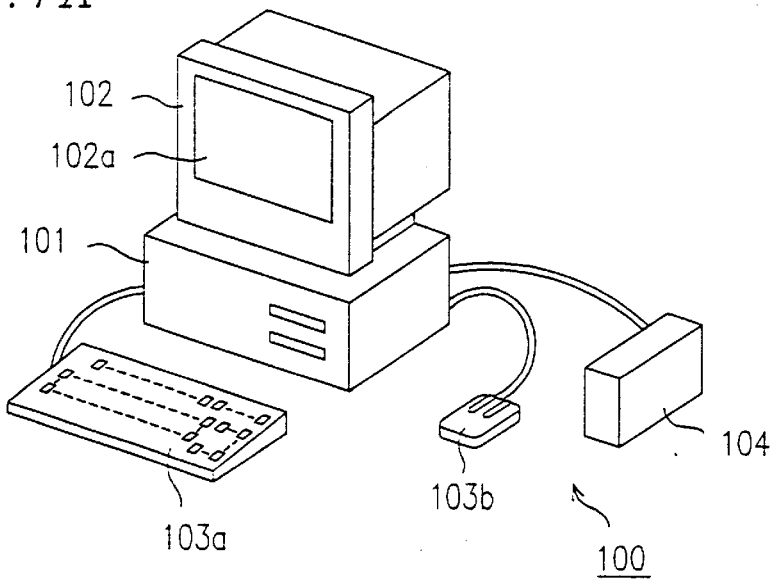
FIGS. 1A and 1B illustrate the configuration of the multi-media data display device in the first example of the present invention.

The present inventors found that a more flexible and more effective display control can be performed on a solid-state object in a three-dimensional space by providing not only the basic component data specifying the object (i.e., the geometric data and the attributive data) but also various kinds of display control data therefor. And the present inventors also found that an effective display control is enabled for an individual object located within a view area by continuously defining a correspondence between the visual appearance of the individual object (or the display style of the object on the display screen) and the positional coordinates of the display style data representing the visual appearance of the object in a one-dimensional or multi-dimensional display style data space by a desired function with respect to the individual object.

By defining the display style of an object in the above-described manner, the display style of an individual object is varied in accordance with the movement of the view point position defining a view area in the following manner, for example. When the view point position defining the view area moves backward with respect to the viewing direction, the unimportant ones of the objects located within the view area are displayed on the display screen in the lighter color and in the smaller size as the view point position becomes more distant from the objects. On the other hand, the important ones of the objects located within the view area are also displayed on the display screen in the smaller size as the view point position becomes more distant from the objects. However, the shrinkage ratio of the important ones is smaller than that of the unimportant ones.

First, the outline and the fundamental principles of the present invention will be described.

In the multi-media data display device of the present invention, a one-dimensional or multi-dimensional display style data space in which the display style data defining the display style of the objects exist is set and function data defining a relationship between the display style data of an individual object and the positional coordinates thereof in the display style data space is provided as display control data for the individual object displayed as a multi-media data item.

Also, in this display device, when the coordinates of a data access position are specified, a view area where the objects to be displayed exist is selected from the object space based on the positional coordinates, so that the objects existing within the view area are displayed on the display screen based on the basic components data thereof. When the objects are displayed, the display style of an individual object is determined from the display style data position corresponding to the data access position information in the display style data space based on the function data used as the display control data thereof.

As a result, in this display device, an object demanded by a user is displayed on the display screen in real time so as to have a display style corresponding to the environment surrounding the user, i.e., a display style based on the data access position information having dimensions corresponding to various factors specifying the environment such as a location, a temperature, a humidity and a time.

The specific exemplary applications of the multi-media data display device of the present invention are as follows.

(1) Firstly, the multi-media data display device of the present invention may be implemented as a graphics display device for displaying a three-dimensional or two-dimensional object as a multi-media data item having geometric data and attributive data defined based on the positional coordinates thereof in an n-dimensional space by independently controlling the display style of the individual object.

(2) Secondly, the multi-media data display device of the present invention may be implemented as a car navigation system for displaying objects representing various traffic information such as road signs, road situations and navigation instructions on the display screen at an appropriate time in accordance with the location and the travelling direction of the car such that an individual object has a display style corresponding to the running condition of the car, the weather conditions and the time zone of the day. That is to say, the present invention is applicable to a display device for effectively presenting a driver various information objects required for driving in real time.

(3) Thirdly, the multi-media data display device of the present invention may be implemented as an instruction device applicable to various kinds of office automation devices, industrial machines and home-use electronic units for giving the operating instructions thereof in accordance with the operation state thereof and the repair procedures in the case of failure by approaching the position sensor or the like of the instruction device to a part in question of the office automation device or the like. In such a case, the multi-media data display device of the present invention can appropriately display the operating instructions or the repair procedures on the display in real time along with the object, i.e., the image of the office automation device or the like.

(3a) As a variant of the third application, the multi-media data display device of the present invention may also be implemented as a display device for displaying various information about an exhibit, a product for sale or the like. In such a case, only by approaching the display device to the exhibit or the product, the information about the exhibit or the product can be displayed in real time on the display screen along with the image of the exhibit or the product as an object, and the contents of the information can be changed depending upon the time.

Next, the characteristic configuration of the present invention will be described.

In the multi-media data display device of the present invention, the data about an individual object or a multi-media data item to be displayed is independently defined as the basic component data specifying the object and the visual appearance data (or the display control data) determining the display style of the object. In this case, the basic component data means the geometric data and the attributive data of an object. For example, when the object to be displayed is a speed-limit road sign, the basic component data thereof is the mark of the speed-limit sign object itself including characters like "100 km/h". On the other hand, the visual appearance data is used for determining where and how the display of the object is valid and how the object should be displayed based on the basic component data.

The display control data is a function defining the correspondence between the coordinates of an object in a multi-dimensional space and the display style data representing the display style of the object at the coordinates. As the variables represented as coordinates in a multi-dimensional space, a coordinate value (x, y, z) representing the position of an object in a view area including the objects to be displayed (e.g., a three-dimensional Euclidean space), the direction vector of the object at the position, a time, a temperature, a humidity and the like can be used. As a result, an individual object existing within the view area can be displayed by independently controlling the display style thereof.

In this case, the display data is continuously defined by the display control data (or the function data) with respect to the variables. Thus, the variation of the variables triggers the re-calculation of the display data corresponding to the values of varied variables, so that new display data is displayed on the display screen.

For example, in a car navigation system, as a car moves or as the time passes, the display data of an object is re-calculated based on the display control data (or the function data), so that the object such as a road sign is displayed in a display style corresponding to the location of the car and the time.

EXAMPLE 1

Figure 1B:
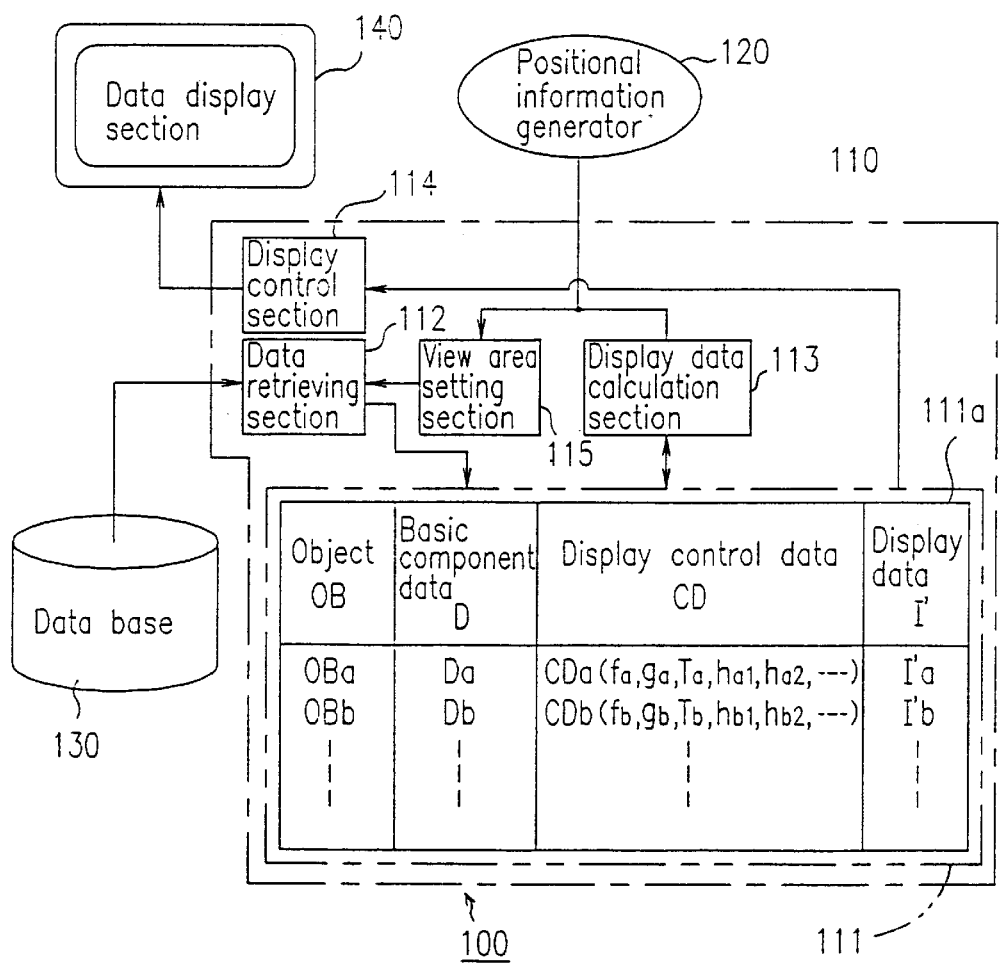

FIGS. 1A and 1B illustrate the configuration of the multi-media data display device in the first example of the present invention: FIG. 1A is a perspective view showing the hardware configuration of the display device, while FIG. 1B is a block diagram illustrating the functions of the respective components of the display device.

In FIG. 1A, the reference numeral 100 is the multi-media data display device in the first example of the present invention for displaying an object or a multi-media data item such as a character, an image, graphics, a moving picture or the like on the display screen 102a based on the basic component data specifying the object. As shown in FIG. 1A, the multi-media data display device 100 includes: a processor 101 for executing various kinds of arithmetic processing; a display device 102 for displaying multi-media data items on an image display screen 102a; a keyboard 103a and a mouse 103b used as input devices 103 for inputting data to the processor 101; and a hard disk device 104 as a storage device for storing the multi-media data therein.

In the hard disk device 104, a database 130 in which not only the basic component data D1 to Dn of objects OB1 to OBn but also the display control data CD1 to CDn for setting the display styles of the objects OB1 to OBn on the display screen 102a are stored so as to correspond to the individual objects has been formed. In this example, intensity distribution functions $f_1$ to $f_n$, intensity factor functions $g_1$ to $g_n$, display transformation functions $h_{11}$ to $h_{nm}$ and display parameters $I_1$ to $I_n$ are defined as the display control data CD1 to CDn corresponding to the individual objects OB1 to OBn (in this specification, an "intensity" is a value representing the size, the color depth and the like of an object displayed on the screen). In addition, intensity normal vector transformation functions $T_1$ to $T_n$ are further defined for objects having directivity, while intensity factors $C_\rho$ are provided for objects having no directivity. Herein, m and n are natural numbers. These functions will be described in detail later.

The processor 101 includes a positional information generator 120 for generating the data access position information (i.e., a data access coordinate x and a data access vector w) in the n-dimensional space and a display controller 110 for controlling the display of predetermined objects based on the positional information.

The display controller 110 includes: a view area setting section 115 for setting a view area including objects to be displayed from a three-dimensional space where various objects exist based on the data access position information; a data retrieving section 112 for retrieving the basic component data D and the display control data CD of the respective objects existing within the set view area from the database 130; and a data storage section 111 in which the retrieved data are stored. In the data storage section 111, a data table (hereinafter, simply referred to as an "S table") 111a for writing the basic component data, the display control data and the display data corresponding to the respective objects thereon has been formed.

The display controller 110 further includes: a display data calculation section 113 for calculating the display data for the individual objects from the positional information based on the display control data; and a display control section 114 for controlling the display of the respective objects in the data display section 140 based on the calculated display data.

In this manner, the multi-media data display device 100 is configured to independently set the display style on the display screen for an individual object existing within the view area in accordance with the data access position information in the n-dimensional space.

Next, the function data used as the display control data of the respective objects stored in the database 130 will be described.

(1) First, the intensity distribution function used as function data will be described.

An intensity distribution function (function data) using the positional coordinates (or the display style data position) in the n-dimensional space (display style data space) as a variable is defined for an individual object to be displayed. Based on this function, an intensity value (display style data) representing the "display level" (i.e., the size, the color depth and the like) of an individual object displayed on the display screen is associated with an individual position in the n-dimensional space including the coordinates of the origin (or the view point) of the view area and the values of the temperature and the humidity. That is to say, the intensity distribution function f is a function for deriving the "display level" ρ (intensity value) of an object corresponding to an arbitrary position vector $X=[x_1, x_2, \ldots, x_{n-1}, x_n]$ given in an n-dimensional space $R^n$. The following Equation 1 represents the intensity distribution function:

$$\rho = f(x_1, x_2, \ldots, (x_{n-1}, x_n) \tag{1}$$

Herein, for the simplicity of the description, the intensity distribution function f is assumed to use the coordinate value (x) in the one-dimensional space as a variable as represented by the following Equation 2.

$$\rho = f(x) \tag{2}$$

Figure 2A:
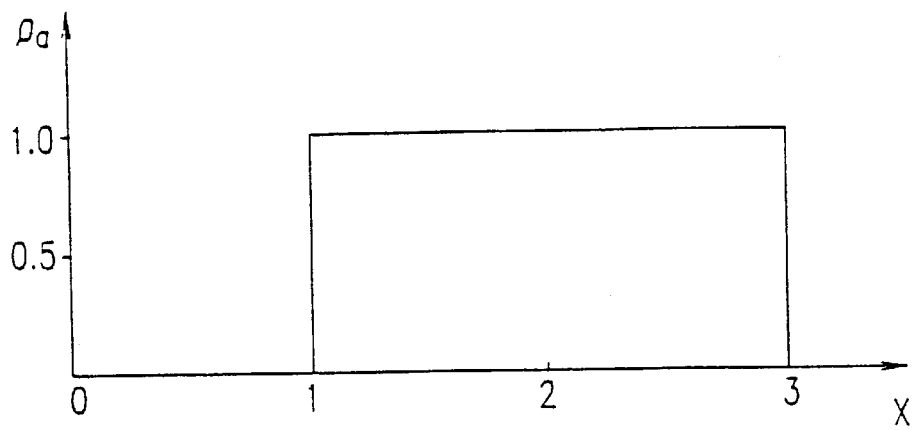
FIGS. 2A, 2B and 2C illustrate specific functions and the like for defining the display style of an object in the multi-media data display device.
Figure 2B:
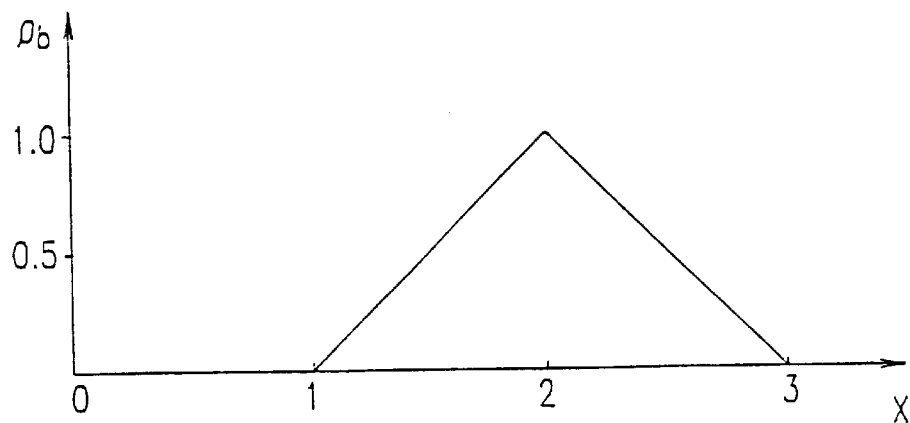
Figure 2C:
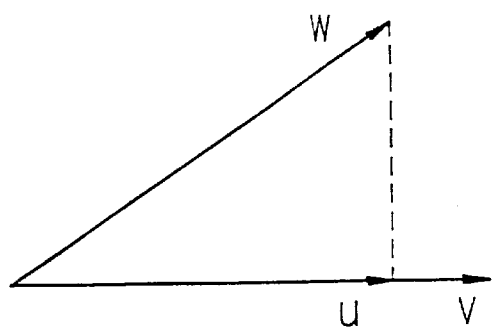

FIGS. 2A, 2B and 2C illustrate specific examples of the first-order intensity distribution function f(x): FIG. 2A shows a graph of a function $\rho_a = f_a(x)$ represented by Equation 3 and FIG. 2B shows a graph of a function $\rho_b = f_b(x)$ represented by Equation 4:

$$\rho_a = f_a(x) = 1.0, \text{ for } 1 \leq x \leq 3 \text{ and } \rho_a = f_a(x) = 0, \text{ for } x < 1, 3 < x \tag{3}$$

$$\rho_b = f_b(x) = x - 1.0, \text{ for } 1 \leq x \leq 2, \rho_b = f_b(x) = -x + 3.0, \text{ for } 2 < x \leq 3 \text{ and } \rho_b = f_b(x) = 0, \text{ for } x < 1, 3 < x \tag{4}$$

Herein, the functions $\rho_a = f_a(x)$ and $\rho_b = f_b(x)$ are intensity distribution functions corresponding to the objects OBa and OBb, for example, and $\rho_a$ and $\rho_b$ represent the display levels (intensity values) of the objects OBa and OBb at the positional coordinate x in the one-dimensional space.

The intensity value $\rho_a$ is 1.0 when the positional coordinate x is in the range from 1.0 to 3.0, both inclusive. When the positional coordinate x is out of this range, the intensity value $\rho_a$ is 0.0. When the positional coordinate x varies from 1.0 to 2.0, the intensity value $\rho_b$ increases at a constant rate from 0.0 to 1.0. On the other hand, when the positional coordinate x varies from 2.0 to 3.0, the intensity value $\rho_b$ decreases at a constant rate from 1.0 to 0.0. Furthermore, when the positional coordinate x is smaller than 1.0 or larger than 3.0, the intensity value $\rho_b$ is 0.0.

By subjecting such intensity distribution functions to the following predetermined processing, the display data I'a and I'b for displaying the objects as images are produced.

Herein, one intensity distribution function is assumed to be defined with respect to an individual object. Alternatively, a plurality of intensity distribution functions may be defined with respect to an individual object such that each intensity distribution function is independently defined for each of a plurality of subsets of the n-dimensional space $R^n$. In such a case, each intensity distribution function is subjected to the below-described processing, a predetermined weight is applied to each intensity distribution function, and then the display data is produced by combining required functions.

(2) Next, an intensity factor will be described.

There are some objects having a directivity. As to such objects, the intensity value ρ derived by the intensity distribution function f is required to be adjusted by an intensity factor $C_\rho$ in view of the viewing direction (or the direction in which the viewer watches the object) when the positional coordinates (data access coordinates) representing the location of the view point are given.

As to the objects having a directivity, a unit vector v indicating the direction which is most affected by the intensity distribution function f (hereinafter, such a vector will be referred to as a "intensity normal vector") is defined.

Generally speaking, there are some objects which need not be displayed if the viewing direction deviates from the predetermined direction, even when the objects are included within the view area. For example, some road signs cannot be seen if the signs are located in the directions other than the travelling direction of the car, even when the signs exist within the view area. Thus, the intensity normal vector v is used for such an object having a directivity. Therefore, the value of the intensity factor which is a constant is directly applied to the objects having no directivity.

As represented by the following Equation 5, this intensity normal vector v is defined by a function T(X) for transforming the positional coordinates X in the n-dimensional space $R^n$ into the position vector v in the n-dimensional space $R^n$ (hereinafter, such a function will be referred to as an "intensity normal vector transformation function").

$$v = T(X) v, X \in R^n \tag{5}$$

As described above, the intensity normal vector transformation function T(X) is used for transforming the data access coordinate X ($[=x_1, x_2, \ldots, x_{n-1}, x_n]$) in the n-dimensional space $R^n$ into the intensity normal vector v. This function T(X) enables to control the intensity value of an object by the viewing direction.

The data access vector w, as well as the data access coordinate x, determines the visual appearance of an object having a directivity. Based on this vector w, the intensity factor $C_\rho$ for adjusting the intensity value ρ of the object at the data access coordinate X is obtained.

That is to say, as represented by the following Equation 6, the intensity factor $C_\rho$ is defined by a function g having a variable scalar (hereinafter, such a function will be referred to as a "intensity factor function g"). The variable scalar is an inner product |u| of a data access vector w and the intensity normal vector v (see the following Equation 7 and FIG. 2C).

$$C_\rho = g(|u|) \tag{6}$$

$$|u| = v \cdot w v, w \in R^n \tag{7}$$

Furthermore, as represented by the following Equation 8, a display scale factor s which is a variable used for the display transformation function h defining the display data I' of an object is defined as the product of an intensity factor $C_\rho$ and an intensity value ρ.

$$s = C_\rho \rho \tag{8}$$

(3) Next, a method for effectively displaying an object using an intensity factor $C_\rho$ and an intensity value ρ will be described.

As represented by the following Equation 9, a display parameter I represents a set of individual parameters ($i_1$, $i_2$, $i_3$, ..., $i_{t-1}$, $i_t$) associated with the display in a display system. It is the above-described display transformation function h that transforms this display parameter I into actual display data I'. It is noted that the actual display data I' also represents a set of individual display data ($i'_1$, $i'_2$, $i'_3$, ..., $i'_{t-1}$, $i'_t$) corresponding to the individual parameters ($i_1$, $i_2$, $i_3$, ..., $i_{t-1}$, $i_t$) composing the display parameter I.

$$I = (i_1, i_2, i_3, \ldots, i_{t-1}, i_t) \tag{9}$$

$$I = (i'_1, i'_2, i'_3, \ldots, i'_{t-1}, i'_t) \tag{10}$$

This display transformation function h uses as variables the display parameter I and the display scale factor s of the object. A plurality of display transformation functions h may be defined with respect to an individual object. For example, in the case where there are a plurality of objects, the display data I'm of the m-th object OBm is represented by the following Equation 11, where m is an arbitrary natural number.

$$I'm = h_m(s_m, I) \tag{11}$$

For example, the actual display data I'a ($=i'a_1, i'a_2, i'a_3, \ldots, i'a_{t31}, i'a_t$) corresponding to an object OBa are obtained from the display parameter Ia ($=ia_1, ia_2, ia_3, \ldots, ia_{t-1}, ia_t$) thereof based on Equation 11.

The display transformation function h may also be defined with respect to an individual one of the predetermined parameters $i_t$ of the display system as represented by the following Equation 12.

$$i'm_t = h_{mt}(s_m, i_t) \tag{12}$$

Hereinafter, as specific representative examples of multimedia data display control, an exemplary display color depth control and an exemplary display size control will be described.

In this case, character data "A" is used as an object OBa and the intensity distribution function thereof is assumed to be $\rho_a = f_a(x)$ (the graph shown in FIG. 2A and represented by Equation 3). In addition, character data "B" is used as an object OBb and the intensity distribution function thereof is assumed to be $\rho_b = f_b(x)$ (the graph shown in FIG. 2B and represented by Equation 4).

First, when the view area is set in accordance with the view information (data access coordinate X) supplied from the positional information generator 120, the basic component data Da and Db of the objects OBa and OBb included within the view area are retrieved from the database 130 and then written onto the S table 111a of the data storage section 111. It is noted that the data access vector w is assumed to be constant, i.e., a position vector (1, 0).

Then, the display data calculation section 113 calculates the display data I'a and I'b of the objects OBa and OBb based on the display control data CDa and CDb thereof and then writes the display data onto the S table 111a. Next, the display control section 114 supplies the display data I'a and I'b written on the S table 111a to the data display section 140.

The intensity normal vectors $v_a$ and $v_b$ of the character data "A" and "B" are equal to the position vector (1, 0) and the intensity factor functions $g_a$ and $g_b$ of these character data are:

$$C_{\rho a} = g_a(|u|) = |u|$$

$$C_{\rho b} = g_b(|u|) = |u|$$

Hereinafter, the arithmetic processing executed by the display data calculation section 113 will be specifically described. First, the display data calculation section 113 calculates the intensity value $\rho_a$ of the character data "A" and the intensity value $\rho_b$ of the character data "B" based on the intensity distribution functions $f_a(x)$ and $f_b(x)$ in response to the data access coordinate X.

Next, the display data calculation section 113 calculates the intensity factors $C\rho_a$ and $C\rho_b$ corresponding to the respective objects. As described above, since the intensity normal vectors $v_a$ and $v_b$ of the character data "A" and "B" are equal to the position vector (1, 0) and the intensity factor functions $g_a$ and $g_b$ are $g_a(|u|) = g_b(|u|) = |u|$ in this case, the intensity factors $C_{\rho a}$ and $C_{\rho b}$ of the character data "A" and "B" are both 1.0 as represented by Equation 6 since the data access vector w is the position vector (1, 0).

Thus, the display scale factors $s_a$ and $s_b$ corresponding to the respective objects OBa and OBb become $\rho_a$ and $\rho_b$ as is clear from Equation 8:

$$s_a = C_{\rho a} \times \rho_a = g_a(|u|) \times \rho_a = 1 \times \rho_a = \rho_a = f_a(x)$$

$$s_b = C_{\rho b} \times \rho_b = g_b(|u|) \times \rho_b = 1 \times \rho_b = \rho_b = f_b(x)$$

Furthermore, the display data calculation section 113 uses the intensity distribution functions $f_a$ and $f_b$ as the display scale factors $s_a$ and $s_b$ of the objects OBa and OBb and then transforms these functions $f_a$ and $f_b$ by the display transformation functions $h_a$ and $h_b$, thereby obtaining the display data I'a and I'b.

In this case, the display transformation functions $h_a$ and $h_b$ are set so as to derive the display data I'a and I'b corresponding to the color depth values of the objects to be displayed by blending the color attributive values I of the character data and the background colors Id of the screen at predetermined ratios determined by the display scale factors $s_a$ and $s_b$ as represented by the following Equations 13 and 14.

$$I'a(i'a_1, i'a_2, i'a_3) = h_1(s_a) = s_a I + (1.0 - s_a) Id \tag{13}$$

$$I'b(i'b_1, i'b_2, i'b_3) = h_1(s_b) = s_b I + (1.0 - 1 s_b) Id \tag{14}$$

Assuming that the three primary color components of light are denoted by Lr (red), Lg (green) and Lb (blue) and the maximum value and the minimum value thereof are 1.0 and 0.0, respectively, a color attributive value I may be represented as a three-real-number-tuples(Lr, Lg, Lb).

In this case, assuming that the character color of the character data is black and the background color is white, the values of the real-number-tuples (Lr, Lg, Lb) corresponding to the color attributive value I of the character data and the background color Id of the screen are as follows.

$$I = (0.0, 0.0, 0.0) \tag{15}$$

$$Id = (1.0, 1.0, 1.0) \tag{16}$$

Consequently, the display colors I'a and I'b of the character data "A" and "B" displayed on the display screen are given by the following Equations 17 and 18 as is clear from Equation 13.

$$(i'a_1, i'a_2, i'a_3) = \rho_a(0.0, 0.0, 0.0) + (1.0 - \rho_a)(1.0, 1.0, 1.0) \tag{17}$$

$$(i'b_1, i'b_2, i'b_3) = \rho_b(0.0, 0.0, 0.0) + (1.0 - \rho_b)(1.0, 1.0, 1.0) \tag{18}$$

In this way, when a data access coordinate x is given, the display controller 110 calculates the intensity values $\rho_a$ and $\rho_b$ corresponding to the data access coordinate x based on the intensity distribution functions $f_a(x)$ and $f_b(x)$ used as the display control data of the objects, and then calculates the display data I'a and I'b.

Figure 3A:
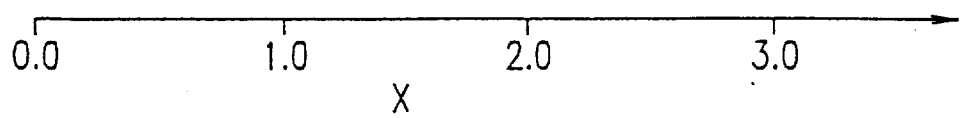
FIGS. 3A through 3C illustrate a process for varying the display styles of character data "A" and "B" in accordance with the variation of data access coordinates.

Then, as shown in FIG. 3A, the display controller 110 re-calculates the intensity values $\rho_a$ and $\rho_b$ and the display data I'a and I'b every time the data access coordinate x is varied, thereby varying the display styles of the character data "A" and "B" in accordance with the variation of the data access coordinate x.

Next, a case of controlling the display size of an object will be described.

Herein, an exemplary method for controlling the size of an object to be displayed by using the intensity distribution functions as the display control data for the objects and by performing an interpolation between the standard (maximum) size of the data and the permissible minimum size thereof will be described.

It is assumed that the constant of the size of an object to be displayed is denoted by I, the minimum size thereof is denoted by Id and the display scale factor is denoted by s.

The display data I' of the object displayed on the screen can also be represented by Equation 13 in the same way as in the case of controlling the color depth thereof.

In this example, the size attributive value of a character is assumed to be represented by the point. Equations 19 and 20 indicate the standard size I of the character and the permissible minimum size Id thereof by the point.

$$I = 36.0 \tag{19}$$

$$Id = 0.0 \tag{20}$$

As is clear from Equation 13, the display sizes (points) I'a (I'a$_4$) and I'b (I'b$_4$) of the character data "A" and "B" displayed on the screen are represented by the following Equations 21 and 22:

$$i'a_4 = h_2(s_a) = s_a I + (1.0 - s_a)Id = 36.0 s_a \tag{21}$$
$$= 36.0 C_{pa} \times \rho_a = (36.0)\rho_a$$

$$i'b_4 = h_2(s_b) = s_b I + (1.0 - s_b)Id = 36.0 sb_a \tag{22}$$
$$= 36.0 C_{pb} \times \rho_b = (36.0)\rho_b$$

In this case, when a data access coordinate x is given, the display controller 110 also calculates the intensity values $\rho_a$ and $\rho_b$ corresponding to the data access coordinate x based on the intensity distribution functions f$_a$(x) and f$_b$(x) used as the display control data of the objects, and then calculates the display data I'a and I'b.

Figure 3B:
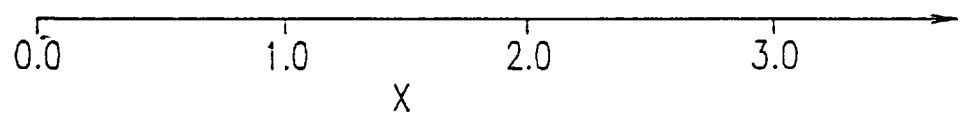

Then, as shown in FIG. 3B, the display controller 110 re-calculates the intensity values $\rho_a$ and $\rho_b$ and the display data I'a and I'b every time the data access coordinate x is varied, thereby varying the display styles (i.e., sizes) of the character data "A" and "B" in accordance with the variation of the data access coordinate x.

Next, a case of simultaneously controlling the display color depth and the display size will be described.

That to say, if the above-described color depth control and size control are combined, then it is possible to simultaneously control the color depth and the size of the display data.

Therefore, in this case, in accordance with Equation 13, the display data I'a (=i'a$_1$, i'a$_2$, i'a$_3$, i'a$_4$) and I'b (=i'b$_1$, i'b$_2$, i'b$_3$, i'b$_4$) about the color depth values and the sizes (points) of the character data "A" and "B" displayed on the screen are specifically as follows:

$$(i'a_1, i'a_2, i'a_3) = \rho_a(0.0, 0.0, 0.0) + (1.0 - \rho_a)(1.0, 1.0, 1.0) \tag{23}$$

$$(i'b_1, i'b_2, i'b_3) = \rho_b(0.0, 0.0, 0.0) + (1.0 - \rho_b)(1.0, 1.0, 1.0) \tag{24}$$

$$i'a_4 = s_a \cdot I + (1.0 - s_a)Id = 36.0 s_a \tag{25}$$
$$= 36.0 C_{pa} \times \rho_a = (36.0)\rho_a$$

$$i'b_4 = s_b \cdot I + (1.0 - s_b)Id = 36.0 s_b \tag{26}$$
$$= 36.0 C_{pb} \times \rho_b = (36.0)\rho_b$$

Figure 3C:
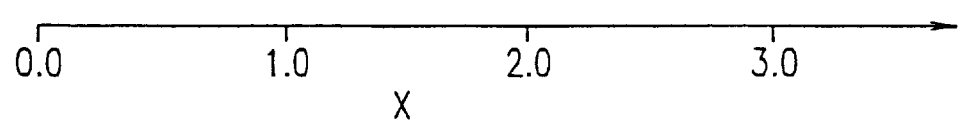

Assuming that the intensity functions, the intensity factors and the like of the character data "A" and "B" are the same as those described above, when the variable x of the intensity distribution function f(x) is varied from 0.0 to 3.0, the displayed character data "A" and "B" are varied as shown in FIG. 3C. In this case, two display transformation functions h$_1$, and h$_2$ are defined for an individual object.

Figure 4:
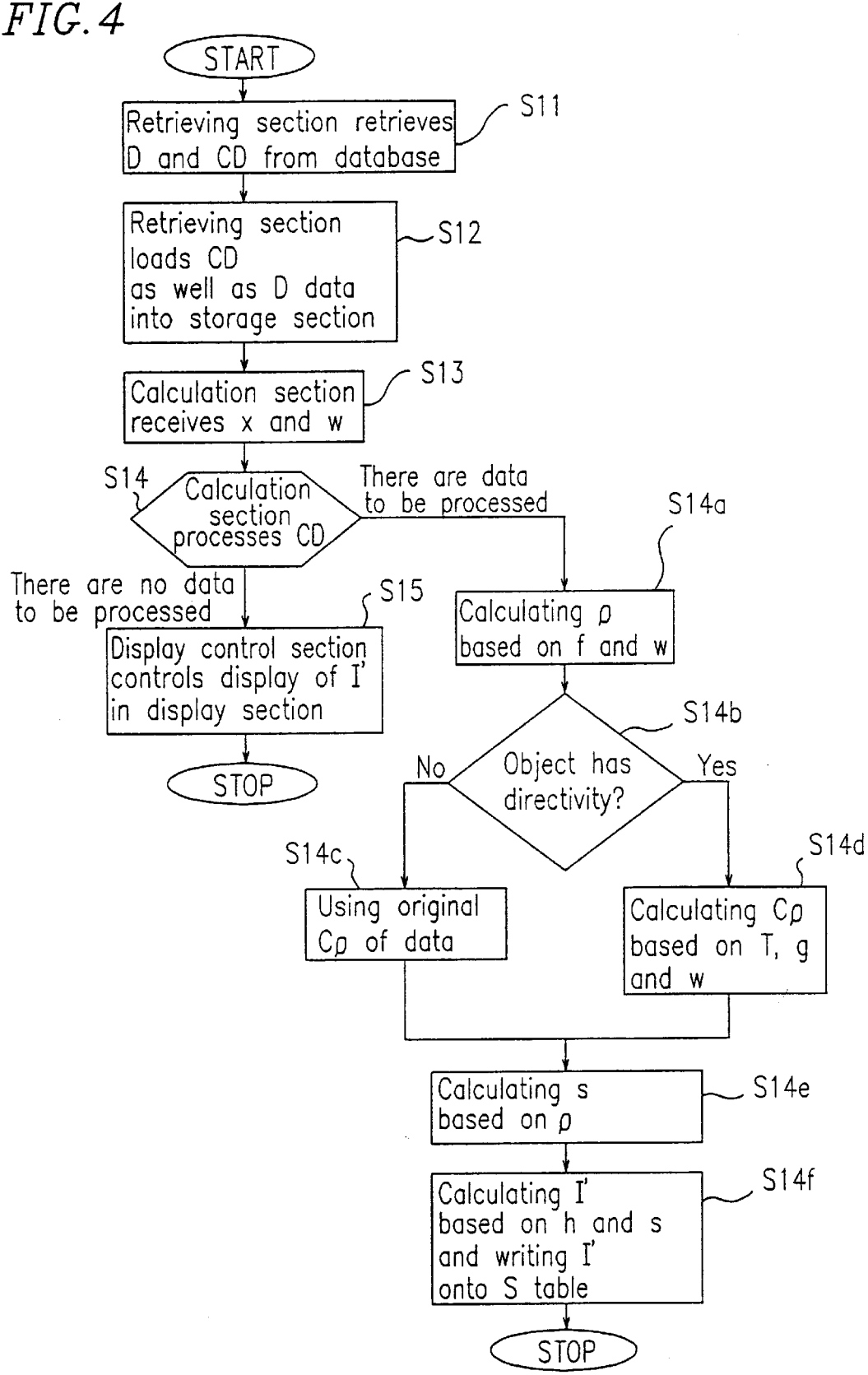
FIG. 4 is a flow chart illustrating the general operation of the multi-media data display device.

Next, the general operation of the multi-media data display device will be described with reference to FIG. 4.

When the data access coordinate and the data access vector generated by the positional information generator 120 are varied, the view area setting section 115 newly sets a view area. Then, in response to the output thereof, the data retrieving section 112 retrieves the basic component data and the display control data of the objects which have been included within the new view area from the database 130 (Step S11).

Then, the data retrieving section 112 loads not only the basic component data of the objects but also the intensity distribution functions f, the intensity factor functions g, the intensity normal vector transformation functions t, the display transformation functions h and the display parameters I as the display control data into the data storage section 111 (Step S12).

The display data calculation section 113 receives the data access coordinate and the data access vector (Step S13) and then repeatedly performs the following processing on the display control data of the respective objects stored in the data storage section 111 based on these data (Step S14).

More specifically, in this Step S14, the display data calculation section 113 calculates the intensity value ρ of an individual object based on the intensity distribution function of the object and the data access vector (Step S14a). Next, the calculation section 113 determines whether or not the object has a directivity (Step S14b) and calculates the intensity factor C$_ρ$ for an object having a directivity based on the intensity normal vector transformation function, the intensity factor function and the data access vector thereof (Step S14d). On the other hand, the calculation section 113 directly uses the intensity factor C$_ρ$ of an object if the object has no directivity (Step 14c).

Next, the calculation section 113 calculates a display scale factor s based on the intensity value ρ calculated in Step S14a (Step S14e).

Thereafter, in Step S14f, the calculation section 113 calculates the display data I' from the display scale factor s and the display parameter I based on the display transformation function h of the object and then writes the display data I' onto the S table 111a of the data storage section 111. When the calculation section 113 finishes producing all the display data I' based on the display control data of the objects stored in the data storage section 111, the display control section 114 controls the display of the objects in the data display section 140 based on these written display data I'.

EXAMPLE 2

Figure 5:
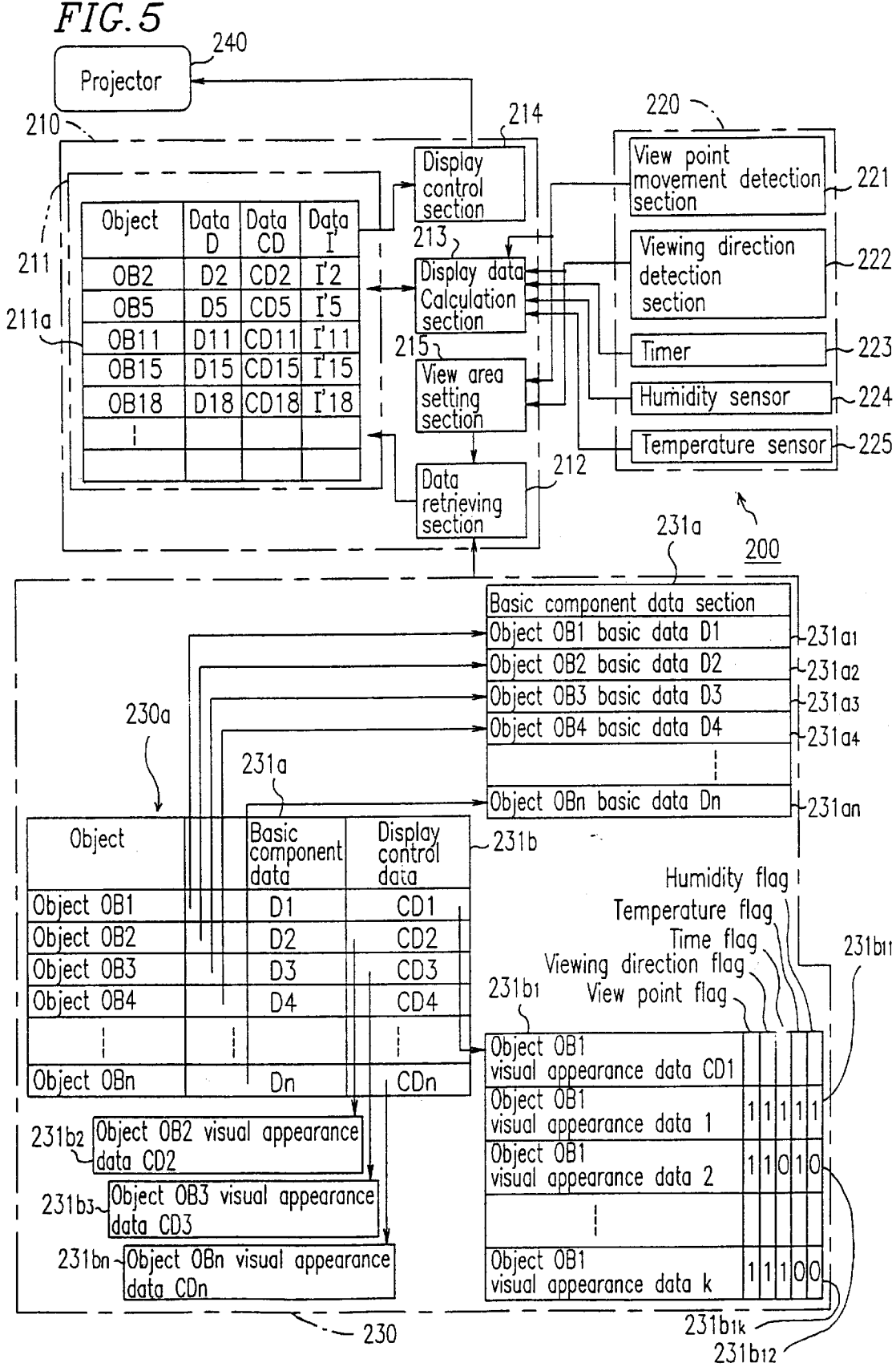
FIG. 5 is a block diagram illustrating a navigation system using the multi-media data display device in the second example of the present invention.

FIG. 5 is a block diagram illustrating a navigation system using the multi-media data display device in the second example of the present invention. In FIG. 5, the reference numeral 200 is a car navigator apparatus having a projector 240 used as the display device in the second example. The car navigator apparatus 200 includes: an object database 230 in which the data of all the objects OB1 to OBn to be displayed by the navigation system are stored; a variation detector 220 for detecting the variation in running condition and environment; and a display controller 210 for receiving the detection output of the variation detector 220 and controlling the display of the objects by the projector 240 based on the data of the respective objects stored in the object database 230.

The variation detector 220 includes: a view point movement detection section 221 for detecting the movement of the view point position (in this case, the variation of the location of a car) in the same way as a conventional car navigator apparatus; and a viewing direction detection section 222 for detecting the variation of the viewing direction (in this case, the variation of the travelling direction of the car). In this second example, the variation detector 220 further includes: a timer 223; a humidity sensor 224 for detecting the humidity outside the car; and a temperature sensor 225 for detecting the temperature inside the car.

In the object database 230, an all-object ID table 230a (hereinafter, simply referred to as an "ID table") on which the data about all the objects OB1 to OBn to be displayed have been written is stored. The ID table 230a includes a basic component data section 231a in which the basic component data D1 to Dn specifying the respective objects OB1 to OBn (i.e., the geometric data specifying the shape and the position of the objects and the attributive data representing the color thereof and the like) have been written, and a display control data section 231b in which the display control data CD1 to CDn for setting the display styles of the objects on the display screen have been written.

In addition, basic component data storage regions $231a_1$ to $231a_n$ corresponding to the respective objects are further provided for the basic component data section 231a and display control data storage regions $231b_1$ to $231b_n$ corresponding to the respective objects are further provided for the display control data section 231b. Furthermore, each of the display control data storage regions $231b_1$ to $231b_n$ is subdivided into subregions for describing various factors (such as the display size, the display color depth and the like) defining the display styles of the objects thereon. For example, the storage region for the display control data CD1 of the object OB1 is subdivided into a plurality of factor storage subregions $231b_{11}$ to $231b_{1k}$ corresponding to a plurality of factors defining the display style of the object OB1. The visual appearance data (or function data) 1 to k of the object OB1 are stored in the respective factor storage subregions $231b_{11}$ to $231b_{1k}$.

Also, a view point flag, a viewing direction flag, a time flag, a temperature flag and a humidity flag corresponding to the types of the detection outputs from the variation detector 220 are set for each of the visual appearance data 1 to k. Based on these flags, it is determined whether or not variation in view point, viewing direction, time, temperature or humidity has affected each of the visual appearance data 1 to k.

The display controller 210 includes a data storage section 211 for temporarily storing therein the basic component data D, the display control data CD and the calculated display data I' of the objects to be displayed at a point in time when the car is at a predetermined location for travelling toward a predetermined direction. In the data storage section 211, a display object table (hereinafter, simply referred to as an "S table") 211a for writing thereon the basic component data D, the display control data CD and the display data I' of the objects so as to correspond to the respective objects has been formed.

The display controller 210 further includes: a view area setting section 215 for setting a view area based on the view point position supplied from the view point movement detection section 221 and the viewing direction supplied from the viewing direction detection section 222; and a data retrieving section 212 for retrieving the basic component data D of the respective objects included within the set view area, which are to be displayed in accordance with the detected current location and travelling direction of the car, from the ID table 230a of the database 230 and then writing these data onto the S table 211a of the data storage section 211.

The display controller 210 further includes a display data calculating section 213 for calculating the display data I' with respect to the objects, the data of which have been read out into the data storage section 211 and a display control section 214 for controlling the display of the objects through the projector 240 based on the display data I' calculated by the display data calculation section 213. Herein, using the basic component data D and the display control data CD stored in the data storage section 211, the display data calculation section 213 calculates the display data I' of an individual object based on the view point position detected by the view point movement detection section 221, the viewing direction detected by the viewing direction detection section 222, the timed output of the timer 223 and the detection outputs of the sensors 224 and 225 in the variation detector 220. In addition, the display data calculation section 213 additionally performs the three-dimensional viewing process described in the description of the prior art for calculating the display data I'.

Figure 6A:
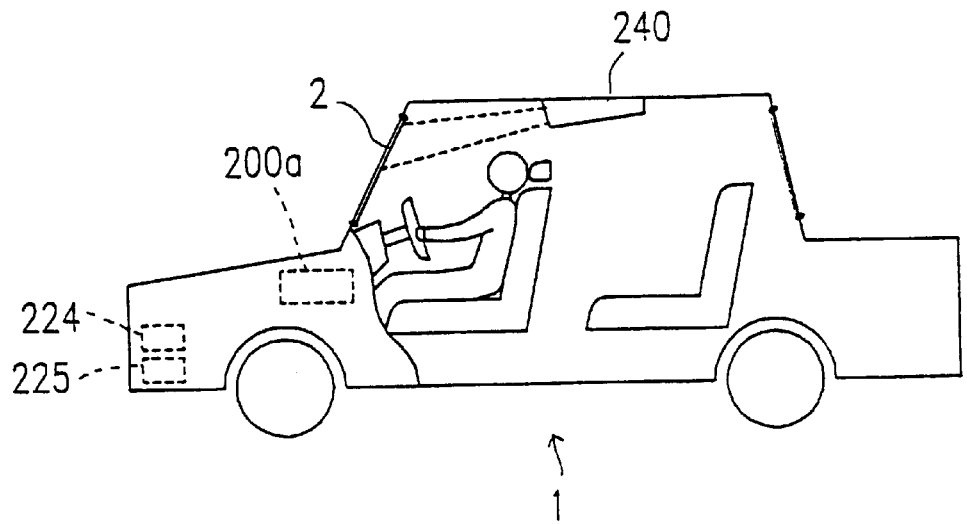
FIGS. 6A and 6B are schematic representations illustrating a navigator apparatus 200 installed in a car as an exemplary navigation system of the second example.

As shown in FIG. 6A, the car navigator apparatus 200 is installed in the body 1 of the car. The navigator body 200a is installed in the instrument panel portion in the front section of the body 1, while the humidity sensor 224 and the temperature sensor 225 are attached on the inner surface of a front fender, for example, such that these sensors are exposed to the outside air.

The navigator body 200a includes a storage device such as a ROM or a RAM in which the object database 230 has been formed, a central processing unit (CPU) in which the display controller 210 has been formed, the view point movement detection section 221 for detecting the current location of the car through the radio wave transmitted from a communication satellite or the like, the viewing direction detection section 222 for detecting the travelling direction based on an azimuthal magnet or the speed of the travelling car, and the timer 223.

Figure 6B:
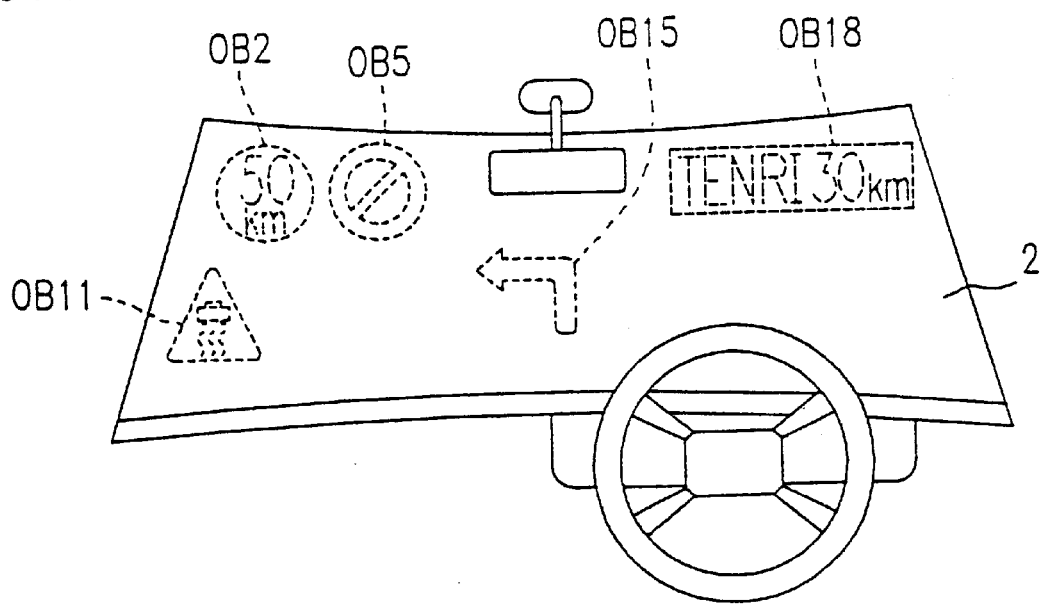

On the other hand, the projector 240 is attached on the inner surface of the ceiling of the car body 1. As shown in FIG. 6B, the projector 240 projects various navigation information objects such as road sign objects onto the front glass 2 of the body 1 at respective portions of the front glass 2 unlikely to disturb the driver's sight.

Herein, a speed-limit road sign object OB2, a noparking road sign object OB5, a "slippery when wet" sign object OB11, "left turn" sign object OB15 instructing the car to turn to the left at the forthcoming intersection and distance data object OB18 indicating the distance from the current location to the destination (Tenri) are displayed as navigation information objects on the front glass 2.

Next, the operation of the navigator apparatus 200 will be described.

In this case, as shown in FIGS. 7A to 7F, assuming that a speed-limit road sign object OB2, a noparking road sign object OB5 and distance data object OB18 are displayed as the navigation information on the front glass 2, it will be described how the display styles of the two road sign objects OB2 and OB5 are varied in accordance with the movement of the view point position, i.e., the location of the car. It is noted that the display style of the distance data OB18 is not controlled.

Figure 8A:
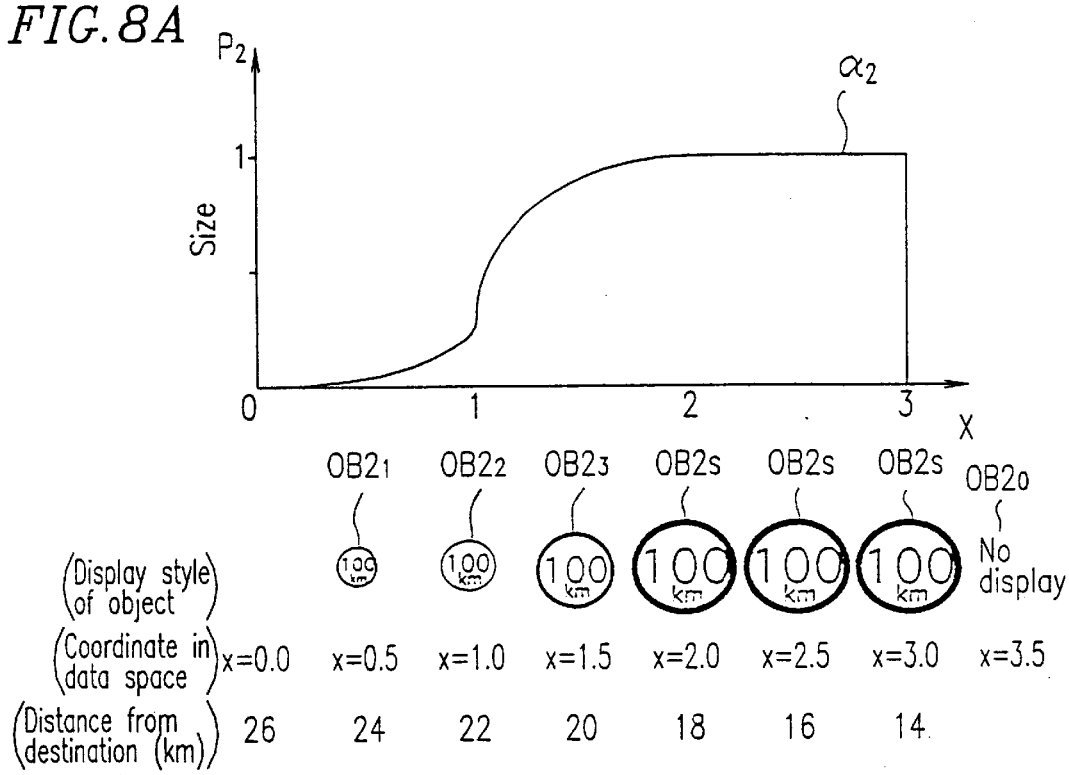

Also, the display style data space set in the navigator apparatus 200 is herein assumed to be a one-dimensional space. A graph $\alpha_2$ representing a function $f_2$ (function data) defining the relationship between the display size (intensity value) $\rho_2$, one of the display style data determining the display styles of the object OB2, and the positional coordinate x (corresponding to the position of the view point) in the display style data space is shown in FIG. 8A. In a map area where the positional coordinate x is from 1 to 3, the speed limit is 100 km/h. In this case, the positional coordinates (x=0.5), (x=1.0), (x=1.5), (x=2.0), (x=2.5) and (x=3.0) in the display styles data space correspond to the locations on the map which are distant from the destination "Tenri" by 24 km, 22 km, 20 km, 18 km, 16 km and 14 km, respectively.

Figure 8B:
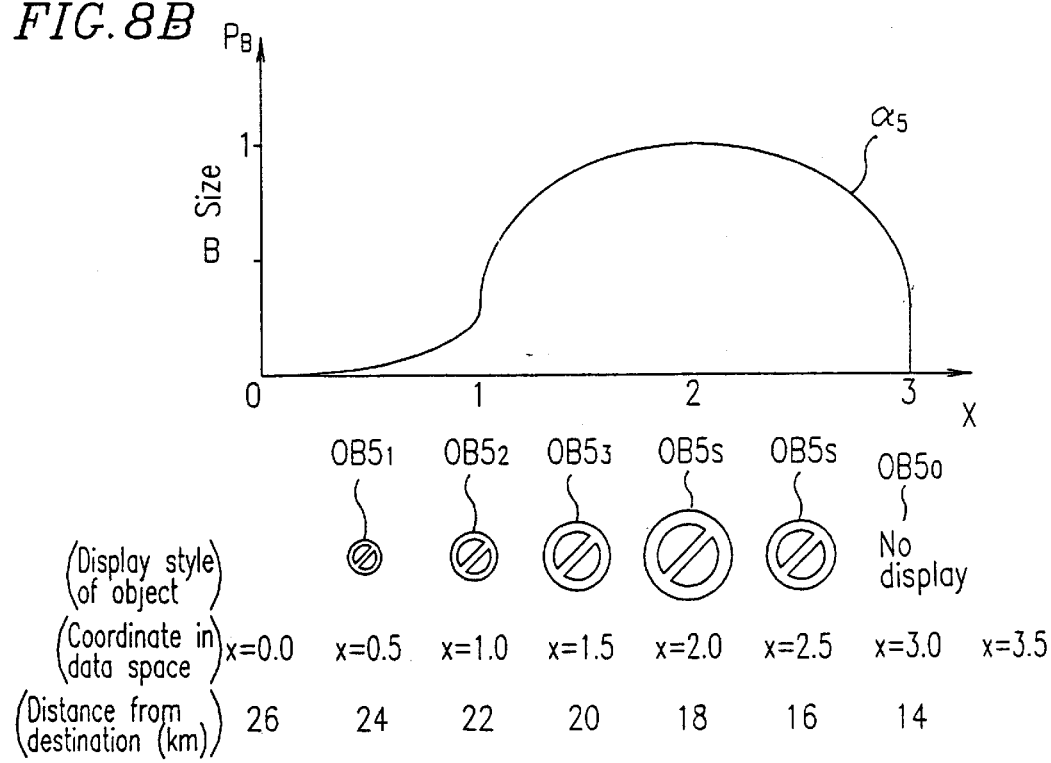
FIG. 8B is a graphic representation showing a graph representing an intensity distribution function defined with respect to the no-parking road sign object OB5.

In addition, a graph $\alpha_5$ representing a function $f_5$ (function data) defining the relationship between the display size (intensity value) $\rho_5$, one of the display style data determining the display styles of the object OB5, and the positional coordinate x (corresponding to the position of the view point) in the display style data space is shown in FIG. 8B.

Comparing these two functions $f_2$ and $f_5$, it can be seen that the variation of the display size (intensity value) $\rho_5$ shown in FIG. 8B is totally the same as that of the display size (intensity value) $\rho_2$ shown in FIG. 8A in the range where the positional coordinate x is from 0.0 to 2.0 in the display style data space. However, in the range where the positional coordinate x is from 2.0 to 3.0 in the display style data space, the variation of the display size (intensity value) $\rho_5$ shown in FIG. 8B is different from that of the display size (intensity value) $\rho_2$ shown in FIG. 8A. That is to say, the display size (intensity value) $\rho_5$ is defined to gradually decrease as the positional coordinate x is varied from 2.0 to 3.0.

Figure 7A:
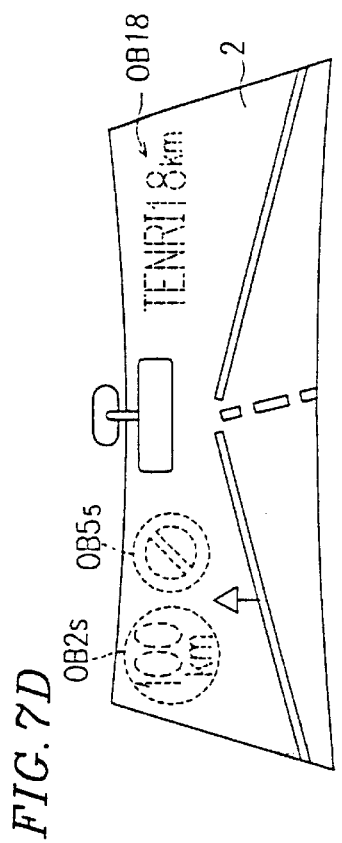
FIGS. 7A to 7F are schematic representations showing how a speed-limit road sign object OB2, a noparking road sign object OB5 and distance data object OB18 displayed on the front glass 2 of the car as the navigation information are varied as the car moves.

In the navigator apparatus in the second example, when the positional coordinate x in the display style data space becomes 0.5, i.e., when the car reaches a location distant from the destination "Tenri" by 24 km, a small object OB2$_1$ representing a road sign indicating a speed limit of 100 km/h and a small object OB5$_1$ representing a road sign indicating no parking appear at the upper left corner on the front glass 2, as shown in FIG. 7A. As a result, the driver can see at the point in time that there is an area in which a speed limit of 100 km/h and no parking rule are valid in front of the driver.

Figure 7B:
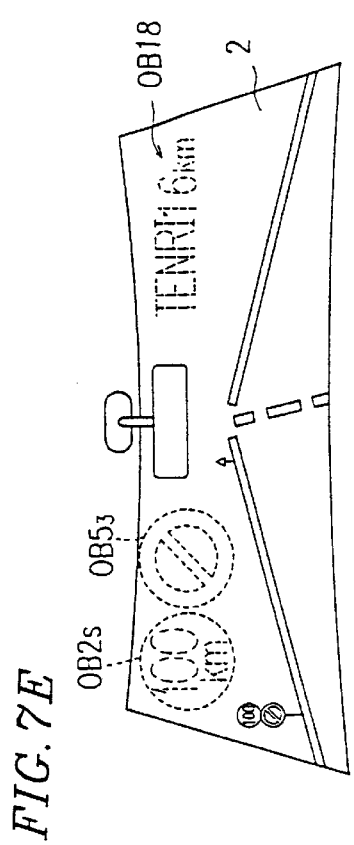

Thereafter, as the car comes closer to the destination (Tenri), the display sizes of the two road sign objects gradually become larger. And when the car reaches a location distant from the destination "Tenri" by 22 km, i.e., the beginning of an area where a speed limit of 100 km/h and no parking rule are valid, a larger speed-limit sign object OB2$_2$ and a larger no-parking sign object OB5$_2$ are displayed on the front glass 2 as shown in FIG. 7B. At this point in time, the positional coordinate x in the display style data space is 1.0.

Figure 7C:
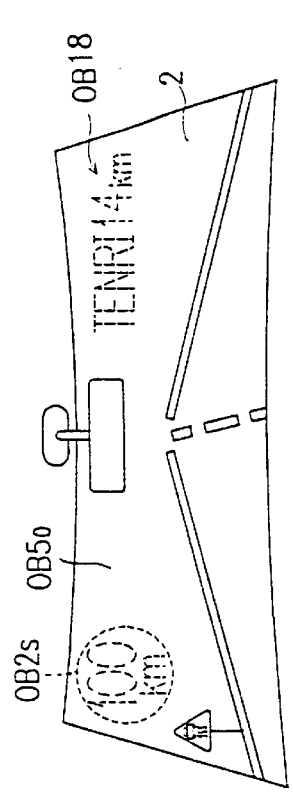
Figure 7D:
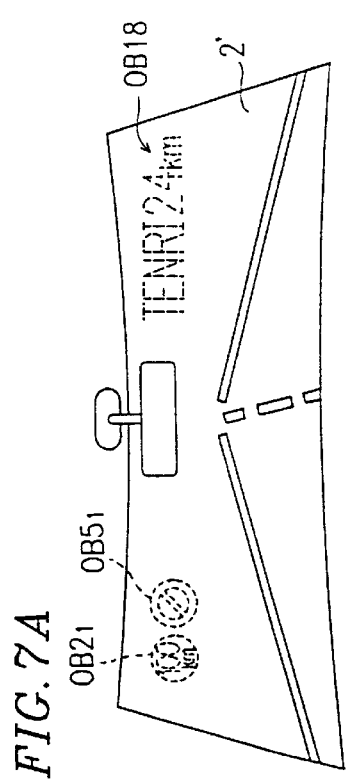

Then, as the car comes further closer to the destination, the display sizes of the two road sign objects become progressively larger. As shown in FIG. 7C, at the location distant from Tenri by 20 km (where the positional coordinate x in the display style data space is 1.5), even larger objects OB2$_3$ and OB5$_3$ are displayed. And when the car reaches a location distant from Tenri by 18 km, road sign objects OB2$_S$ and OB5$_S$ having maximized (or standard) sizes are displayed as shown in FIG. 7D. At this point in time, the positional coordinate x in the display style data space is 2.0.

Figure 7E:
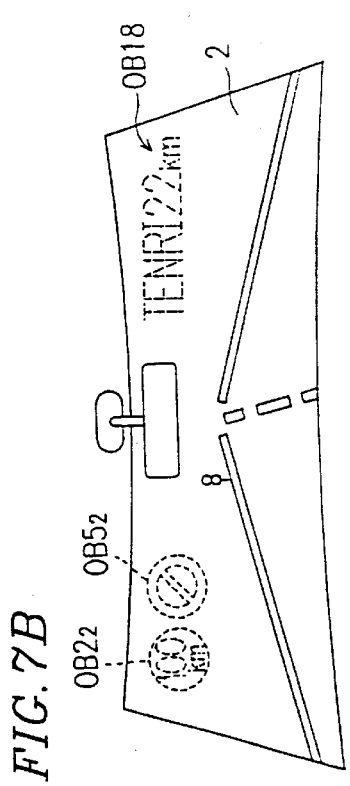
Figure 7F:
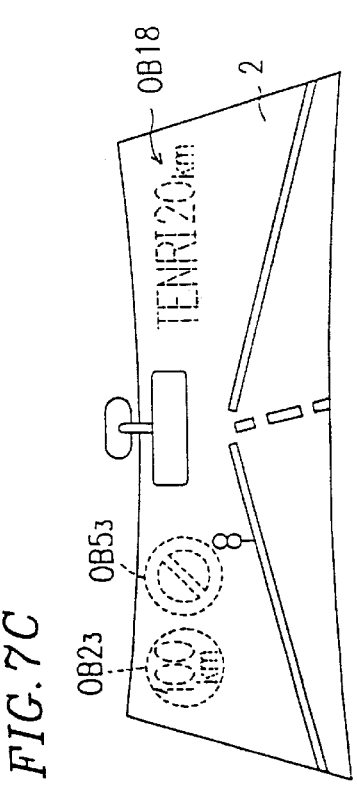

As shown in FIG. 8A, the display size of the speed-limit road sign object OB2 is defined to be constant by the function $f_2$ in the area where the positional coordinate x in the data space is from 2.0 to 3.0. Thus, until the car reaches a location distant from the destination "Tenri" by 14 km, i.e., the terminal of the area where a (speed limit of 100 km/h is valid, a speed-limit road sign object of a standard size is continuously displayed as shown in FIGS. 7E and 7F.

On the other hand, as shown in FIG. 8B, the display size of the no-parking road sign object OB5 is defined to be gradually smaller by the function $f_5$ in the area where the positional coordinate x in the data space is from 2.0 to 3.0. Thus, when the car reaches a location distant from the destination "Tenri" by 16 km (where the positional coordinate x is 2.5), a smaller object OB5$_3$ is displayed as shown in FIG. 7E. And when the car reaches a location distant from the destination "Tenri" by 14 km, i.e., the terminal of the area where a speed limit of 100 km/h is valid, the no-parking road sign object is no longer displayed (i.e., OB5=OB5$_0$ as shown in FIG. 7F).

And after the car has passed the location distant from the destination "Tenri" by 14 km (where the positional coordinate x in the data space is 3.0), the variable $\rho$ representing the display size of the speed-limit road sign object OB2 is 0.0. As a result, the speed-limit road sign object OB2 is no longer displayed on the front glass 2 (i.e., OB2=OB2$_0$).

In this example, the functions $f_2$ and $f_5$ represented by the graphs $\alpha_2$ and $\alpha_5$ in FIGS. 8A and 8B are used as the functions defining the relationship between the display size (intensity value) $\rho$, one of the display style data of the objects OB2 and OB5, and the positional coordinate x (corresponding to the position of the view point) in the display style data space. However, the function defining the relationship between the display size (intensity value) $\rho$ and the positional coordinate x (corresponding to the position of the view point) in the display style data space is not limited thereto.

For example, the display size (intensity value) $\rho$ of the object OB2 may also be defined by the function $f_5$ shown in FIG. 8B. In such a case, when the positional coordinate x in the data space is 2.5, a speed-limit road object "100 km/h" OB2$_3$ smaller than the object OB2$_S$ having the maximized display size (intensity value) $\rho$ in FIG. 8A is displayed.

Figures 9A, 9B:
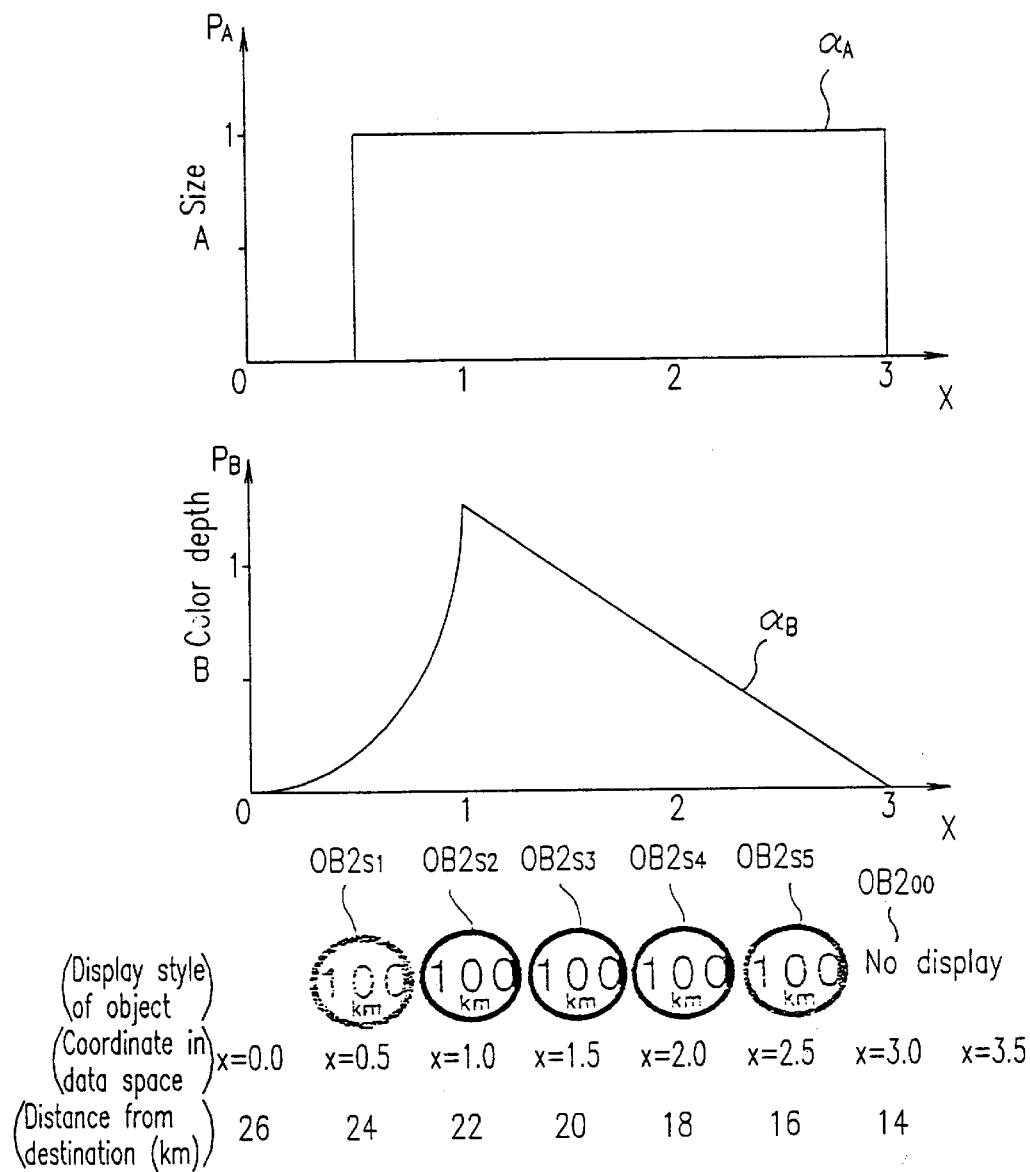

Furthermore, a display color depth as well as the display size may also be defined as the factors (i.e., the display style data) defining the display styles. FIG. 9A shows a graph $\alpha_A$ representing the function $f_A(x)$ defining the relationship between the display size (intensity value) $\rho_A$ and the positional coordinate (position of the view point) x in the data space and a graph $\alpha_B$ representing the function $f_B(x)$ defining the relationship between the display color depth (intensity value) $\rho_B$ and the positional coordinate (position of the view point) x in the data space. On the other hand, FIG. 9B is a table showing the correspondence between the positional coordinates $x_1$ and $x_2$ and the display sizes $A_1$ and $A_2$ and the display color depths $B_1$ and $B_2$ corresponding to the respective coordinates, along with the relations representing the functions $f_A$ and $f_B$.

In the case where the display color depth and the display size are defined as the factors defining the display styles as shown in FIGS. 9A and 9B, the road sign object is constantly displayed in the standard size (i.e., OB2$_{S1}$, OB2$_{S2}$, OB2$_{S3}$, OB2$_{S4}$, and OB2$_{SS}$ as shown in FIG. 9A) in the range where the positional coordinate x in the data space is from 0.5 to 3.0. On the other hand, in the area where the positional coordinate x is out of the range from 0.5 to 3.0, no road sign object is displayed, i.e., OB2=OB2$_{00}$.

On the other hand, the display color depth of the road sign object becomes rapidly deeper from OB2$_{S1}$ to OB2$_{SS}$ as the positional coordinate x in the data space is varied from 0 to 1. However, as the positional coordinate x in the data space is varied from 1 to 3, the display color depth of the road sign object becomes gradually lighter at a constant rate, i.e, OB2$_{SS}$→OB2$_{S4}$→OB2$_{S3}$→OB2$_{S2}$.

In the case where the display styles are defined by the functions $f_A$ and $f_B$ in this way, a road sign object OB$_{S1}$ in a very light color is displayed at the positional coordinate x of 0.5, whereas a road sign object $OB_{SS}$ in the deepest color is displayed at the positional coordinate x of 1.0. The color of the displayed road sign object becomes gradually lighter as the positional coordinate x becomes more approximate to 3.0, so that no road sign object is displayed at the positional coordinate x of 3.0, i.e., $OB2=OB2_{00}$.

In the second example, the (intensity) values of the factors defining the display styles of the objects, e.g., the display size and the display color depth, are defined by the functions using the positional coordinates in the one-dimensional display style data space as variables. Alternatively, the display style data (intensity values) used as the values defining the display styles may also be defined by other functions using positional coordinates in a multi-dimensional space as variables.

For example, in a navigation system to be installed in a car, the values of the factors defining the display styles of the objects (i.e., intensity values) may be defined by a function using the positional coordinates in a two-dimensional space corresponding to the longitude and the latitude as variables. On the other hand, in a air navigation system to be installed in an aeroplane, the intensity values may be defined by a function using the positional coordinates in a three-dimensional space corresponding to the longitude, the latitude and the altitude as variables.

In the second example, the visual appearance control is performed by controlling only the display size of an object or by controlling the display size and the display color depth thereof in combination based on the positional coordinate in the one-dimensional space corresponding to the distance from the destination. Alternatively, the visual appearance control may also be based on the passage of time as well as the commonly recognizable positional coordinates in the three-dimen-sional space.

Figure 10:
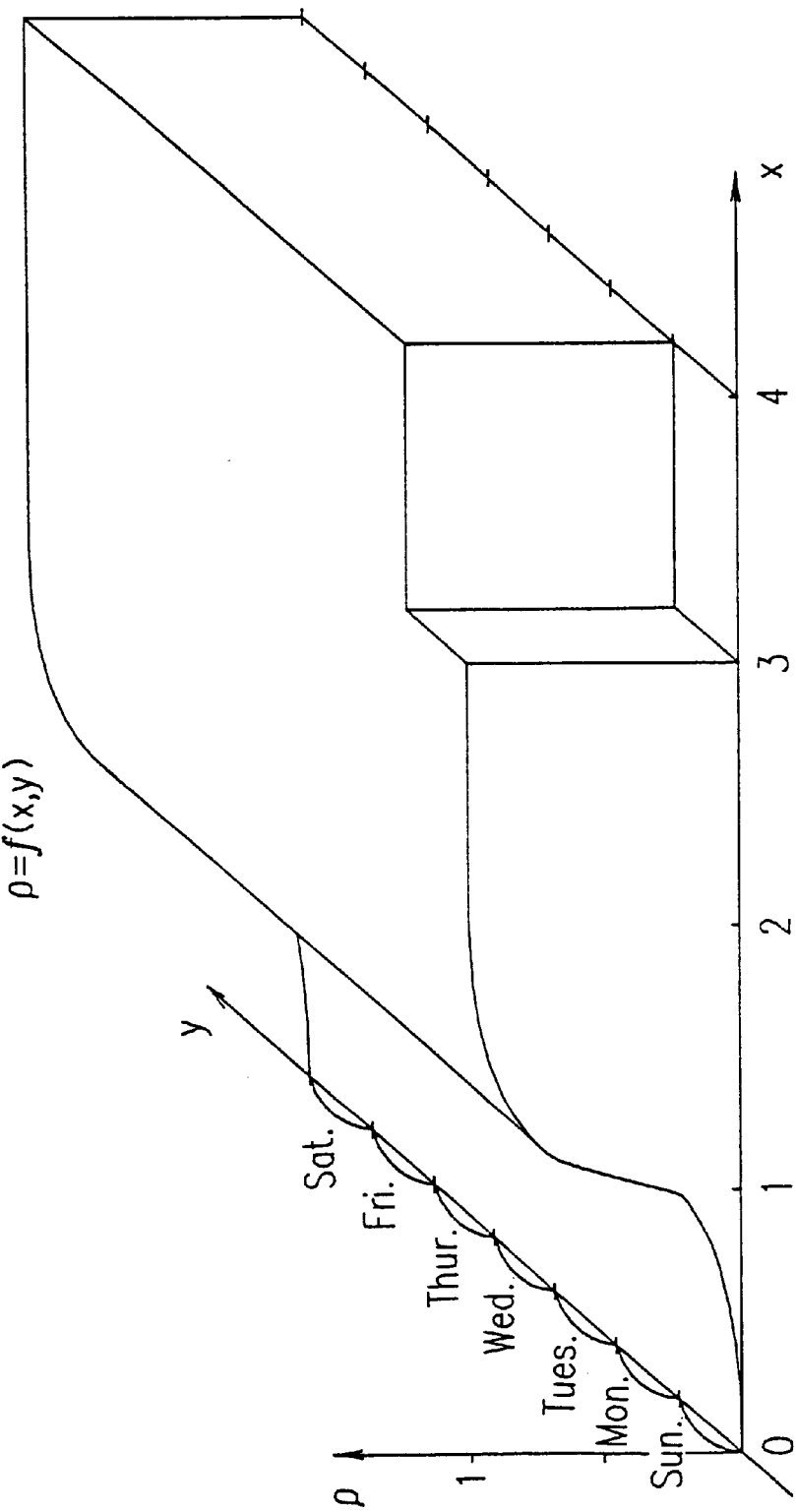
FIG. 10 is a graphic representation showing a function $\rho_c = f_c(x, y)$ defining a relationship among the display size (intensity value) $\rho$, the positional coordinate x and a time coordinate y.

For example, such a time-basis visual appearance control is applicable to traffic regulations on the roads within a school zone such that the speed limitations are valid only on school days. In such a case, another dimension (the y-axis) corresponding to the time axis indicating the time of the day, the day of the week, the day of the month and the month of the year (the axis vertical to the paper sheet) as well as the dimension corresponding to the positional coordinate x (the x-axis) is further provided for the data space shown in FIG. 8A. For example, as shown in FIG. 10, the speed limit road sign object may be displayed in the range where the positional coordinate x is from 1 to 4 on Mondays, Tuesdays, Wednesdays, Thursdays, Fridays and Saturdays, while the speed limit road sign object may be displayed in the range where the positional coordinate x is from 1 to 3 on Sundays. The function $\rho C=f_c (x, y)$ shown in FIG. 10 defines a relationship among the display size (intensity value) $\rho_c$, the positional coordinate x and the time coordinate y.

In this way, the display of a regulation sign can be controlled more finely.

Furthermore, dimensions corresponding to the temperature, the humidity and the like may be additionally provided for the data space, though these factors are not usually displayed. In such a case, the area in which the "slippery when wet" sign object is displayed may be varied in accordance with the temperature and the humidity, or the display color depth of such a road sign object may be set to be deeper as the temperature becomes lower.

Next, a method for processing the data will be described.

Figure 11:
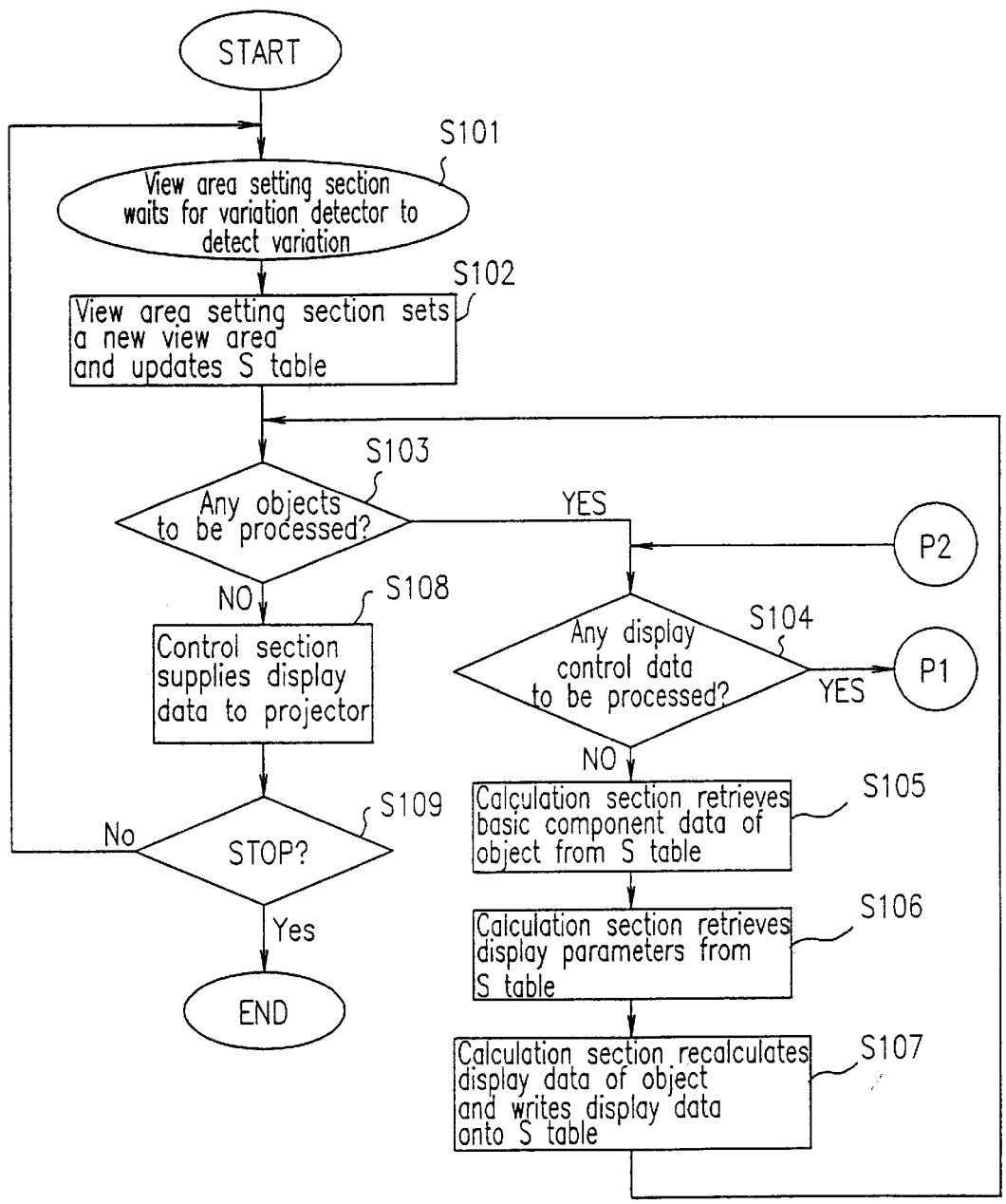
FIG. 11 is a flow chart showing the flow of the display data calculation processing in the navigator apparatus of the second example.
Figure 12A:
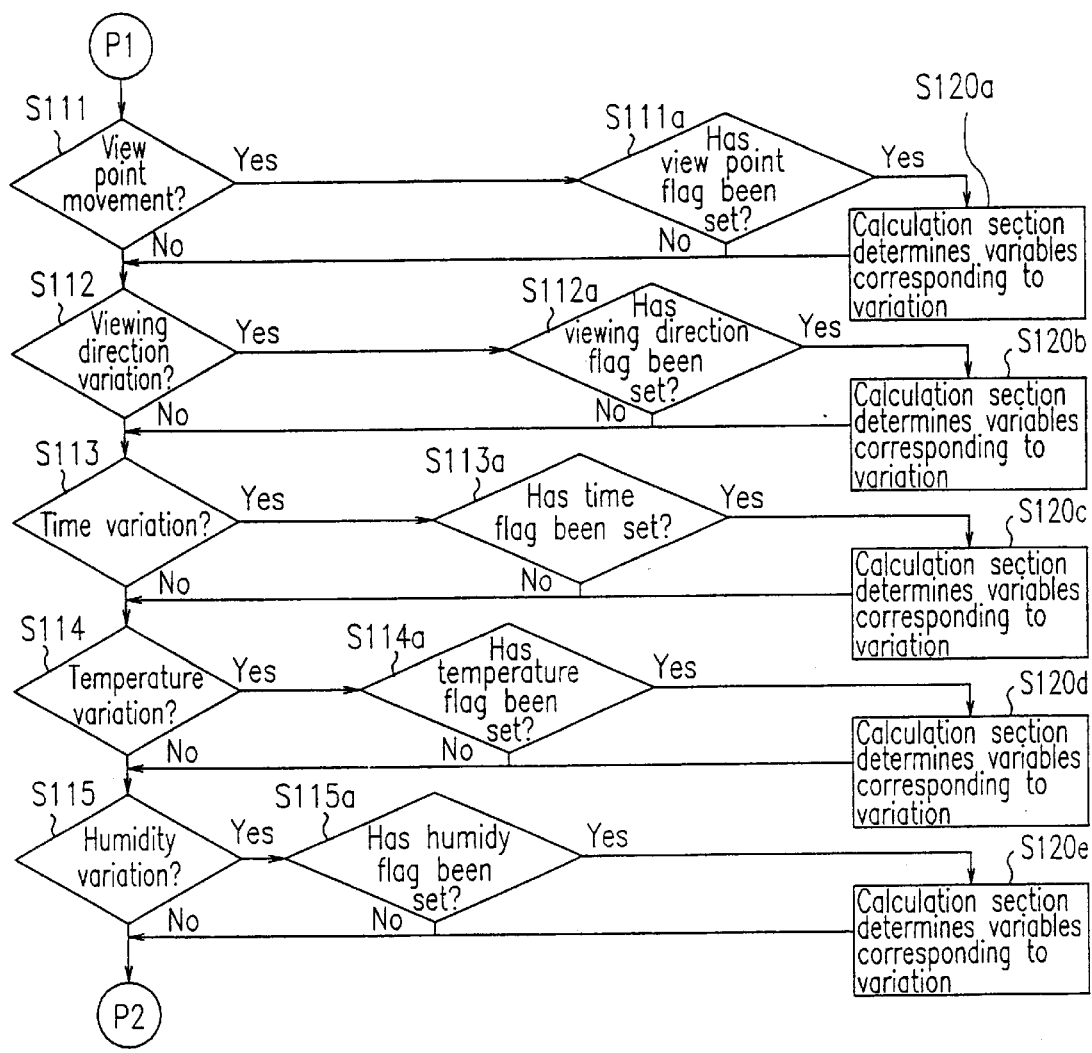
FIGS. 12A and 12B are charts illustrating the processes repeatedly performed with respect to the individual data in the display data calculation processing.
Figure 12B:
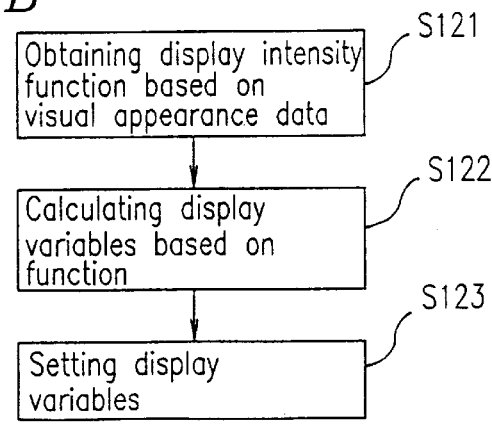

FIG. 11 is a flow chart showing the main flow of the display data processing, while FIGS. 12A and 12B are charts illustrating the processes repeatedly performed with respect to the individual data in the display data processing.

In Step S101, the view area setting section 215 waits for the variation in view point position, viewing direction, time, temperature and humidity to be detected by the variation detector 220. When a variation is caused in the output of any of the view point movement detection section 221, the viewing direction detection section 222, the timer 223, the humidity sensor 224 and the temperature sensor 225, the view area setting section 215 sets a new view area. In response to the output of the view area setting section 215, the data retrieving section 212 updates the S table 211a of the data storage section 211. More specifically, the data retrieving section 212 retrieves the basic data D and the display control data CD of the objects which have entered the view area at the point in time from the ID table 230a of the object database 230, writes these data onto the S table 211a of the storage section 211 and eliminates the basic data of the objects which have been excluded from the view area at the point in time from the S table 211a (Step S102). Herein, the update of the S table 211a is determined by the view variables, i.e., the position of the view point and the geometric data included in the basic component data of the respective objects.

Next, the display data calculation section 213 determines whether or not there are any objects yet to be processed in the S table 211a (Step 103) and also determines whether or not there are any display control data yet to be processed with respect to the first object to be processed (Step S104). If these are any display control data yet to be processed, the display data calculation section 213 starts the processing for calculating the display data I' of the respective objects on the S table 211a based on the basic component data and the display control data thereof, in response to the detection output of the variation detector 220.

That is to say, the calculation section 213 calculates the display data so as to correspond to the variation in the respective outputs of the detector 220, while referring to the view point flag, the viewing direction flag, the time flag, the temperature flag and the humidity flag set for the control data of an individual object on the S table 211a. In this case, the view point flag, for example, indicates whether or not the display control data is affected by the variation of the view point position as a value "0" or "1". Similarly, the viewing direction flag, the time flag, the temperature flag and the humidity flag indicate whether or not the display control data is affected by the variation of the detection outputs about the viewing direction, the time, the temperature and the humidity, respectively, as a value "0" or "1".

More specifically, the calculation section 213 determines whether or not there has occurred any view point movement in Step S111. If there has occurred no view point movement, the process by the calculation section 213 proceeds to Step S112. On the other hand, if there has occurred any view point movement, the calculation section 213 determines whether or not the view point flag of the visual appearance data has been set. If the flag has not been set, the process proceeds to Step S112. On the other hand, if the flag has been set, the calculation section 213 performs variable determination processing corresponding to the view point movement based on the visual appearance data in Step S120a. The process in the Step S120a consists of the following three process steps including Steps S121 to S123.

More specifically, the calculation section 213 obtains, for example, a display intensity function $f_1$ defining the relationship between the display size and the position of the view point based on the visual appearance data (display control data) CD corresponding to the first object on the S table 211a. Next, the calculation section 213 calculates the display variables based on the function $f_1$ in Step S122 and then sets the display variables (or display style data) in Step S123.

Then, the process by the calculation section 213 proceeds to Step S112. In Step S112, the calculation section 213 determines whether or not there has occurred any viewing direction variation. If there has occurred no viewing direction variation, the process proceeds to Step S113. On the other hand, if there has occurred any viewing direction variation, the calculation section 213 determines whether or not the viewing direction flag has been set. If the flag has not been set, the process by the calculation section 213 proceeds to Step S113. On the other hand, if the flag has been set, the calculation section 213 performs variable determination processing corresponding to the viewing direction variation based on the visual appearance data in Step S120b. The process in the Step S120b consists of the three process steps including Steps S121 to S123 in the same way as in the process in Step 120a.

In the same way, the calculation section 213 sequentially determines whether or not there has occurred any variations in time, temperature and humidity (in Steps S113, S114 and S115, respectively) and also determines whether or not the time flag, the temperature flag and the humidity flag have been set (in Steps S113a, S114a and S115a, respectively). In accordance with the respective determination results, the calculation section 213 performs variable determination processing corresponding to the time variation, the temperature variation and the humidity variation (in Steps S120c, S120d and S120e, respectively).

In this case, if it is determined that there has occurred no humidity variation in Step S115, or if it is determined that the humidity flag has not been set in Step S115a or when the variable determination process ends in Step S120e, the process by the calculation section 213 further proceeds to Step S104.

In Step S104, the calculation section 213 determines whether or not there is any display control data (function data) yet to be processed with respect to the object. If there is any non-processed display control data, then the calculation section 213 performs the respective processes in the required ones of Steps S111 to S115a and S120a to S120e as shown in FIG. 12A.

On the other hand, if there is no display control data yet to be processed with respect to the object, the calculation section 213 retrieves the basic component data of the object from the S table 211a (Step S105), further retrieves the set display variables of the object from the S table 211a (Step S106), re-calculates the display data I' of the object (Step S107) and then writes the display data I' onto the S table 211a.

When there is not any object yet to be processed on the S table 211a, the display control section 214 supplies the display data I' of the respective objects from the S table 211a to the projector 240 (Step S108).

As a result, the respective objects are displayed through the projector 240 in accordance with the outputs of the variation detector 220 at the point in time, e.g., the location and the travelling direction of the car. In the case of the car navigator apparatus described above, the road sign objects are displayed through the projector 240 in the respective sizes corresponding to the outputs of the variation detector 220.

Thereafter, it is determined whether or not the display control process is to be continued in Step S109. If the control is to be continued, the process by the display controller 210 returns to Step S101. On the other hand, if it is not to be continued, the display controller 210 ends the process.

EXAMPLE 3

Figure 13A:
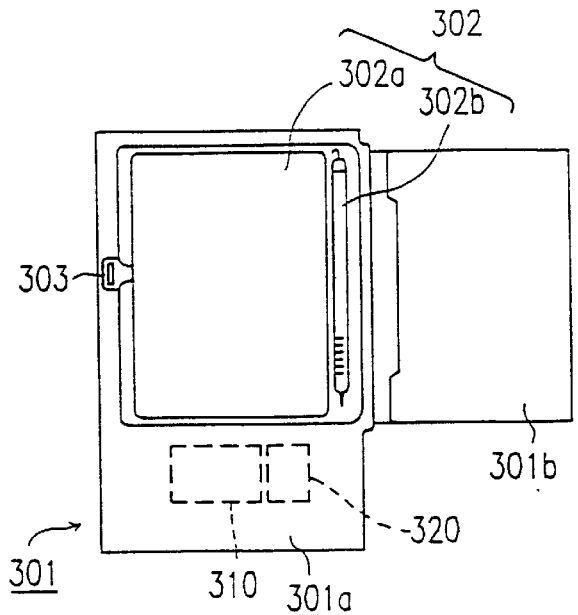
Figure 13B:
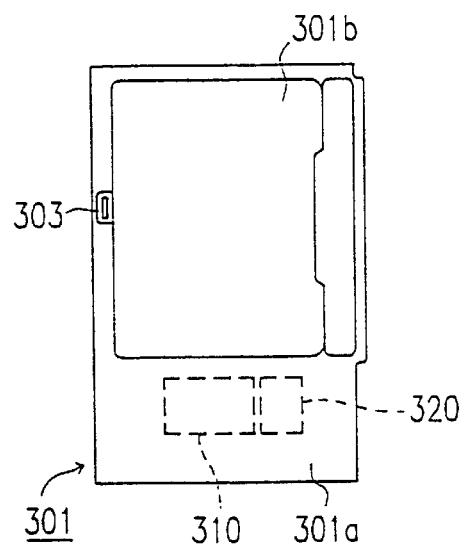
Figure 13C:
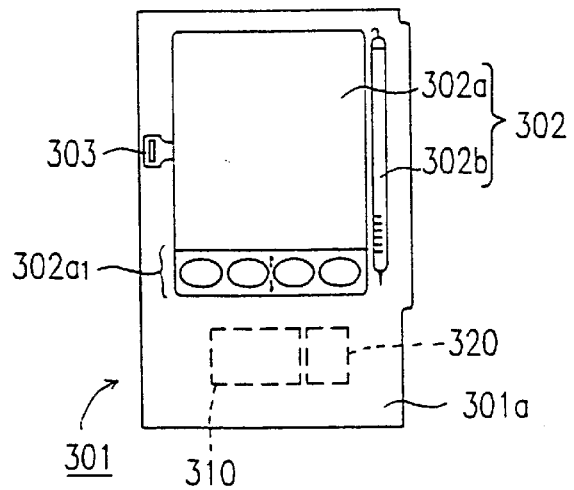

FIGS. 13A through 13C are schematic representations showing the appearance of a small-sized electronic unit including the multi-media data display device in the third example of the present invention for providing information about an exhibit, a product for sale or the like. FIG. 13A shows a state where the protective cover attached to the body of the small-sized electronic unit is opened; FIG. 13B shows a state where the cover is closed; and FIG. 13C shows a state where the protective cover is folded back to the rear side of the unit.

In FIGS. 13A to 13C, the reference numeral 301 is a notebook-shaped small-sized electronic unit for displaying the information about an exhibit, a product for sale or the like. Only by approaching the unit 301 to the exhibit, the product for sale or the like, the information about the exhibit or the product can be displayed on the display screen of the unit 301 in real time such that the contents of the information can be flexibly changed depending upon the situation.

The small-sized electronic unit body 301a includes a data processor 310 for processing the respective display data and a data input/output device 302 for inputting and outputting data to/from the data processor 310. The data input/output device 302 includes a tablet for inputting data therethrough and a liquid crystal display panel for displaying the data thereon. The data input/output device 302 is formed of a planar input/output section 302a in which the tablet and the liquid crystal display panel have been integrally formed so as to function in association with each other, and a touch pen 302b used for inputting and manipulating data on the planar input/output section 302a. Moreover, a protective cover 301b for protecting the liquid crystal display surface of the planar input/output section 302a is attached to the unit body 301a so as to be freely folded to take either a state where the surface of the input/output section 302a is covered with the cover 301b, or a state where the cover 301b has been folded back to the rear side of the unit body 301a. A locking mechanism 303 is further provided at the left end of the unit body 301a for securing the protective cover 301b thereon such that the cover 301b covers the surface of the input/output section 302a. As shown in FIG. 13C, an icon display section $302a_1$ is further provided on the liquid crystal display panel of the input/output section 302a.

The small-sized electronic unit body 301a further includes a detector 320 for detecting the position, the orientation and the temperature and the humidity of the surrounding environment thereof and generating the data of the current time.

Figure 14:
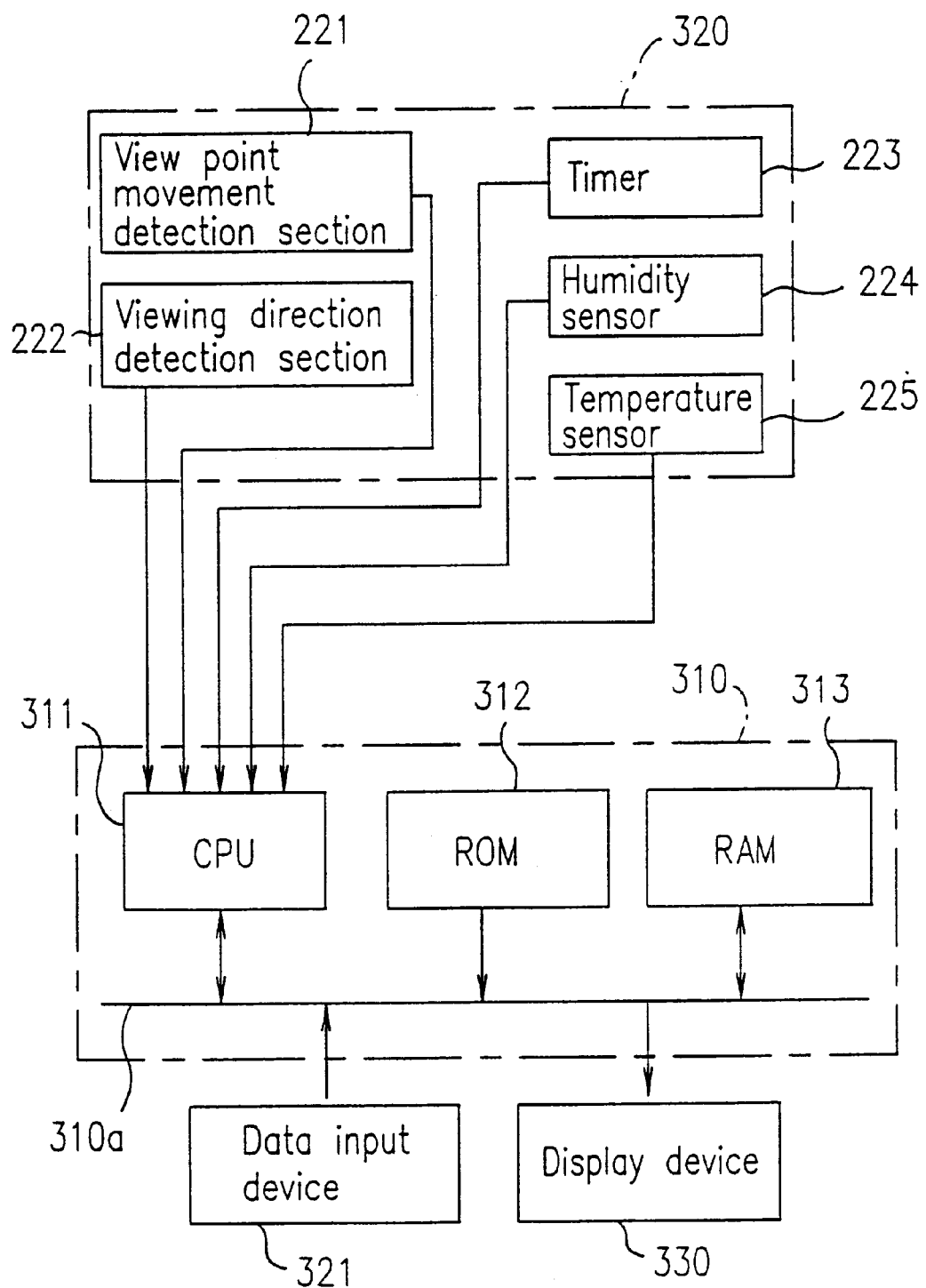
FIG. 14 is a block diagram showing the hardware configuration integrated into the small-sized electronic unit for realizing a display data processing function.
Figure 15:
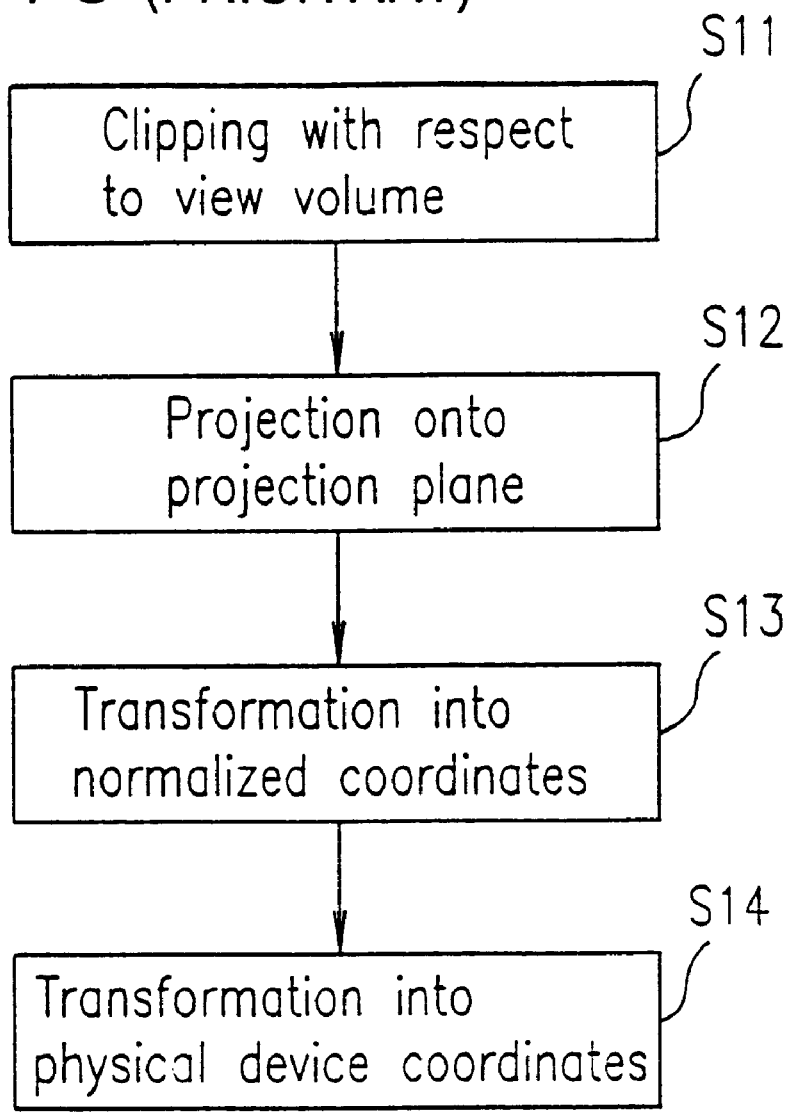
FIG. 15 is a chart diagrammatically illustrating the process flow executed in a general three-dimensional viewing process.
Figure 16:
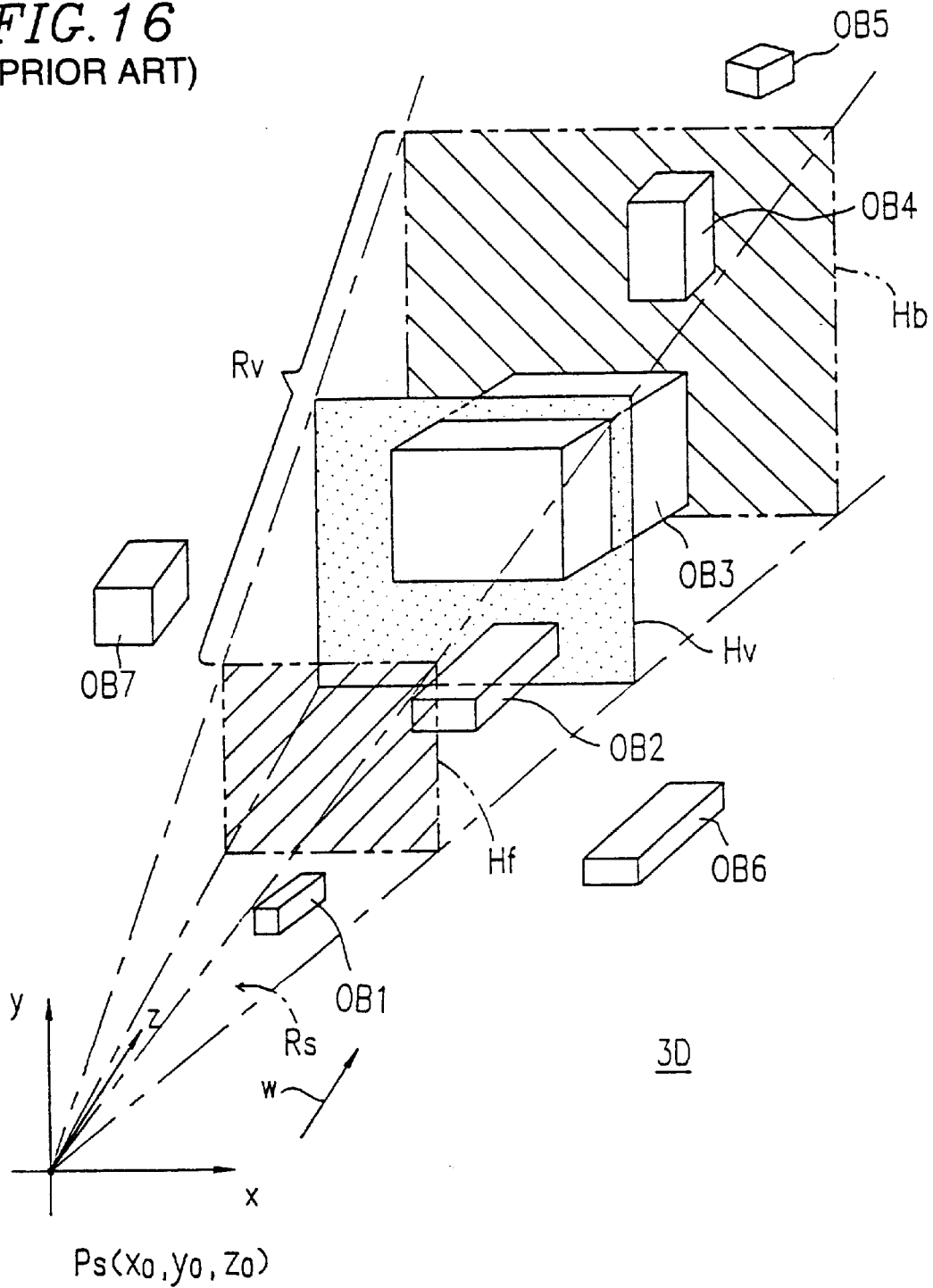
FIG. 16 is a diagram for illustrating a clipping process with respect to a view volume and a projection process of the objects within the view volume in the three-dimensional viewing process, showing a three-dimensional space where a plurality of objects exist.
Figure 17:
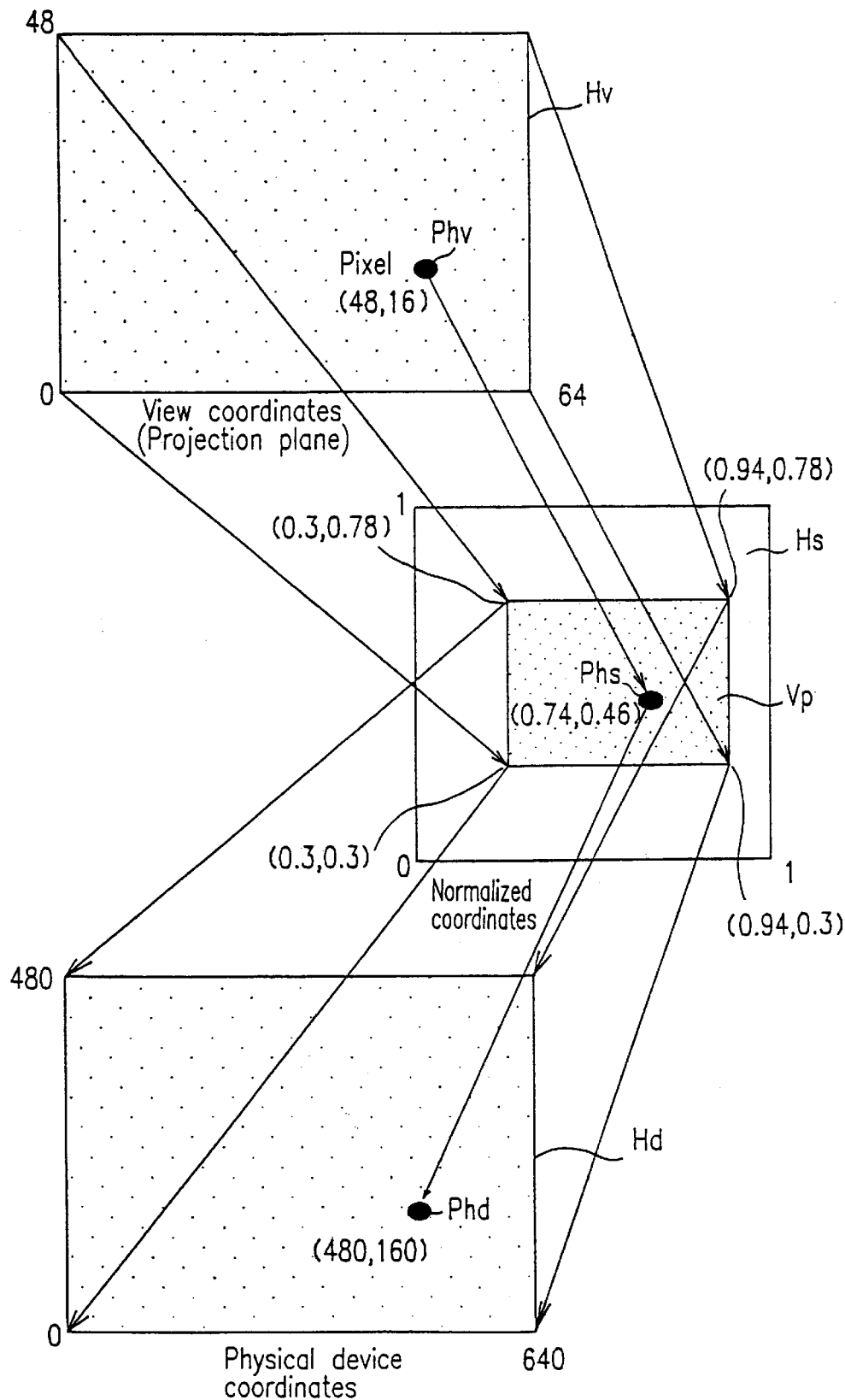
FIG. 17 is a diagram illustrating a process for transforming a point Phv on a projection plane (or the view coordinate plane) Hv into a point Phd on a display screen of a physical device via a point Phs within a viewport Vp on a normalized coordinate plane Hs in the three-dimensional viewing process.
Figure 18:
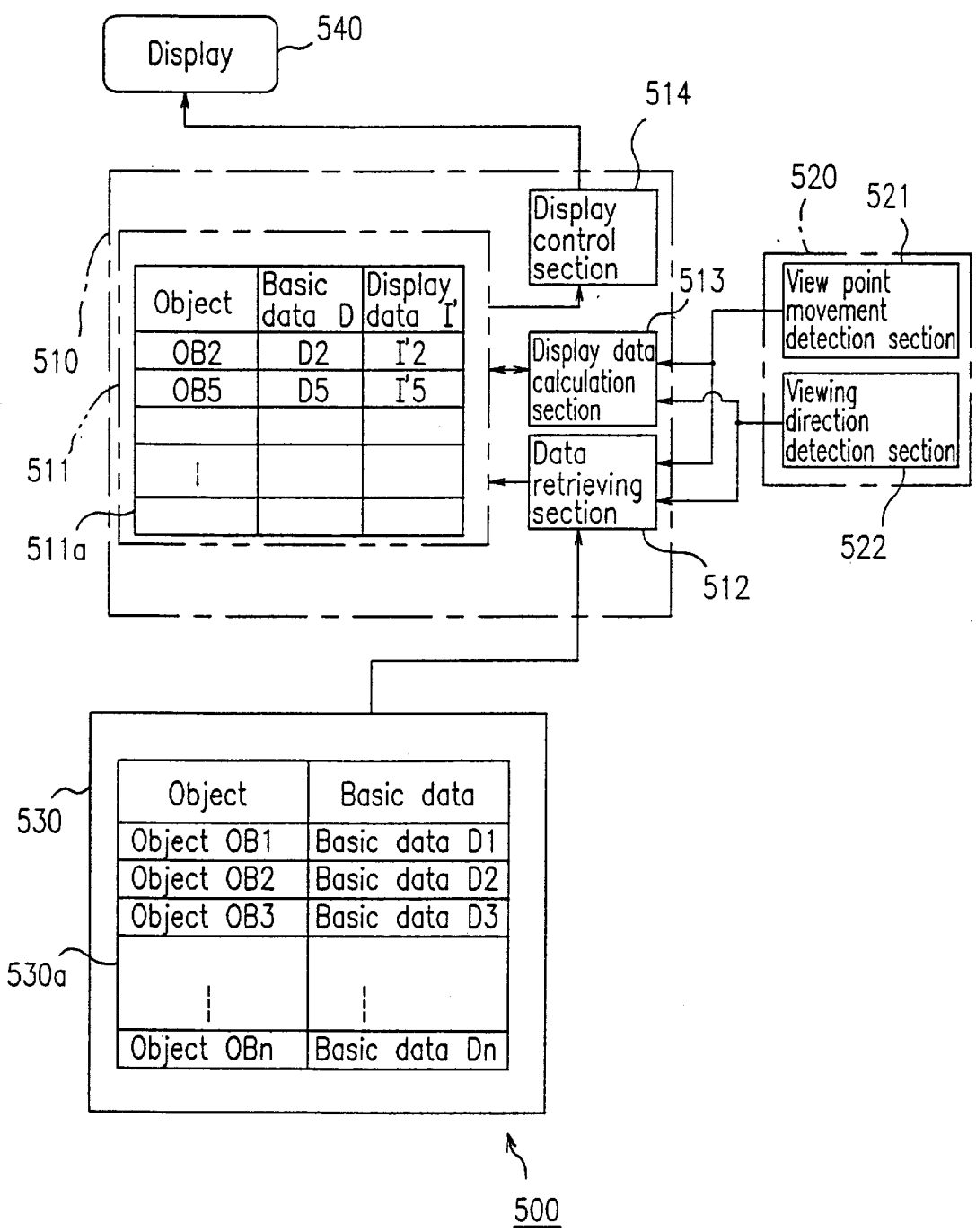
FIG. 18 is a block diagram illustrating a conventional navigation system.
Figure 19:
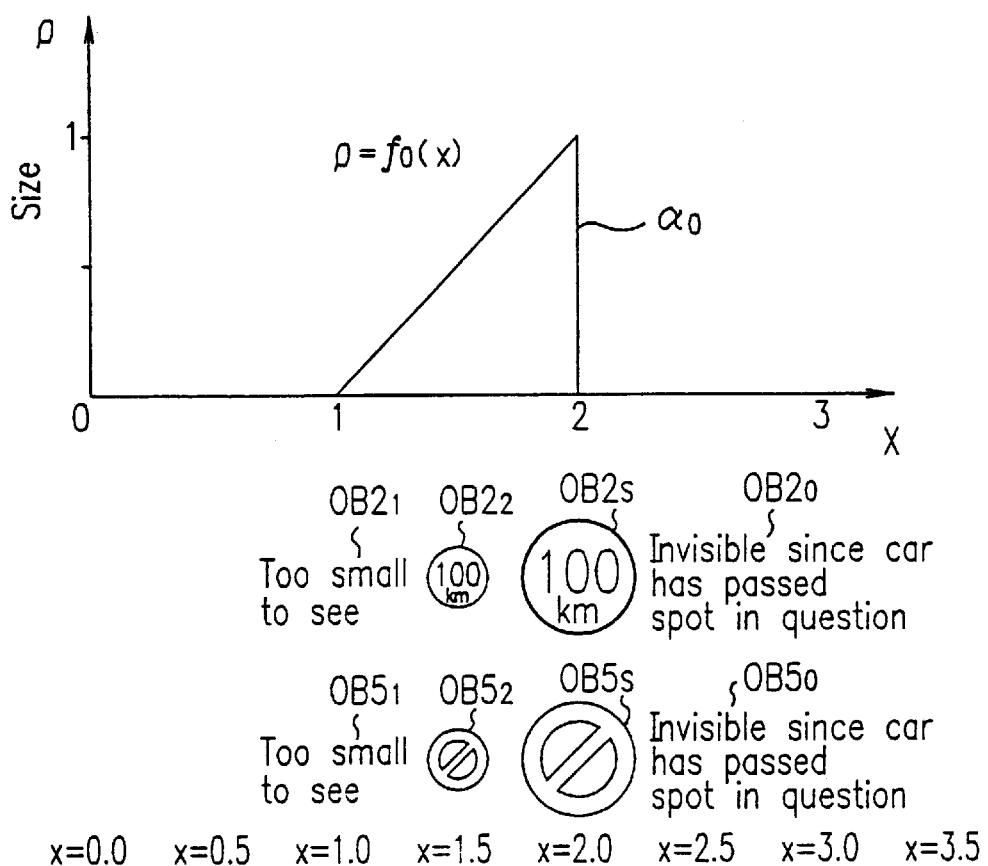
FIG. 19 is a diagram illustrating the operation of the conventional navigation system, showing how the sizes of road sign objects displayed on a display are varied depending upon the location of a car and the graph of a function showing the relationship between the normalized size of the road sign object and the location of the car.
Figure 20:
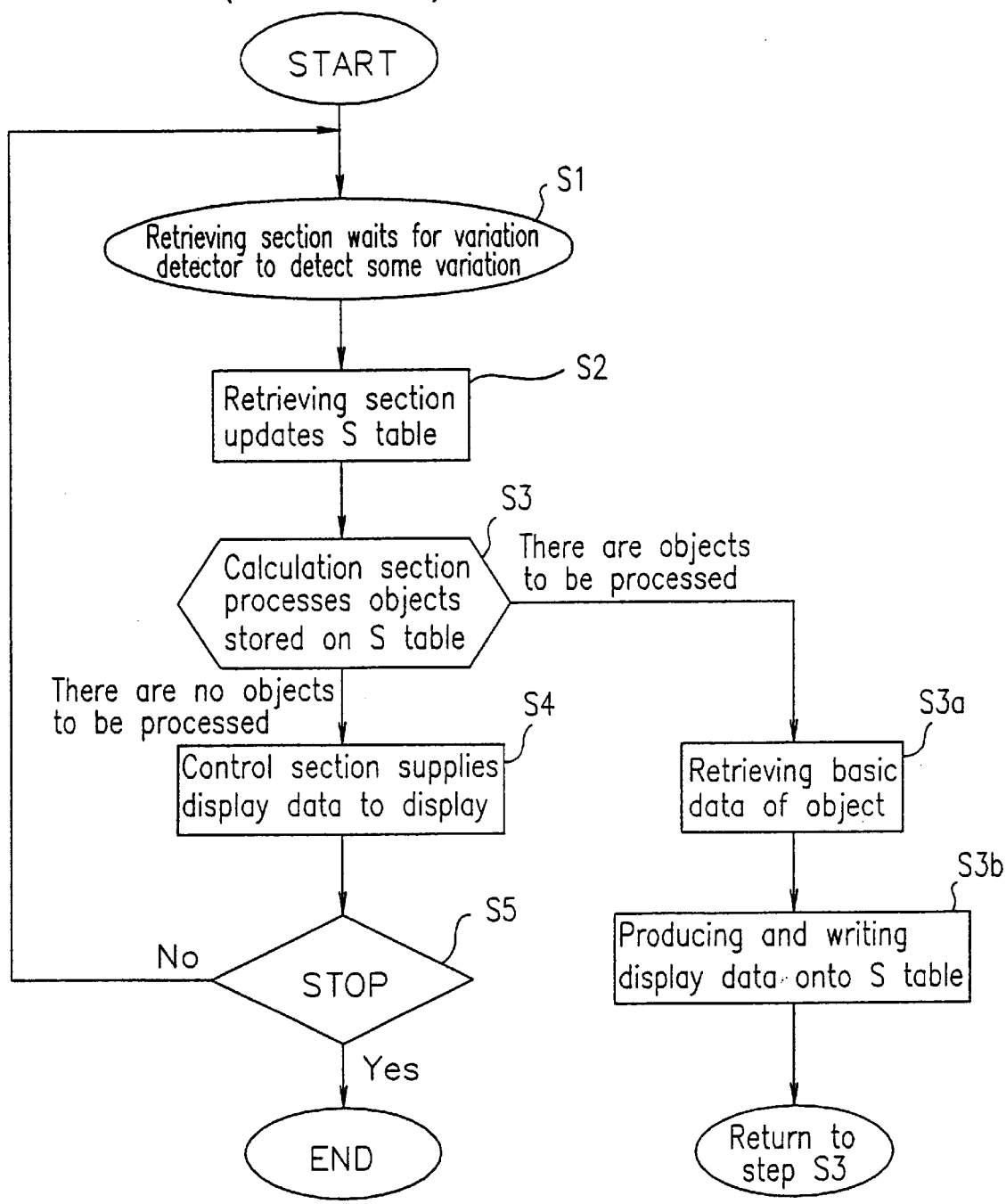
FIG. 20 is a flow chart illustrating the flow of the display process for the road sign objects in the conventional navigation system.

FIG. 14 is a block diagram showing the hardware configuration integrated into the small-sized electronic unit for realizing the display data processing function. In this case, the display data processing function is applicable to identifying an exhibit, a product for sale or the like which is located in the vicinity of the unit, thereby displaying the information about the product or the exhibit on the display screen of the unit 301 in real time such that the contents of the information can be flexibly changed depending upon the situation.

In FIG. 14, the reference numeral 311 is a central processing unit (CPU), for performing the display data processing, which has been integrated into the data processor 310 of the small-sized electronic unit 301 for providing the information about a product or the like. The data processor 310 further includes a ROM 312 in which the programs for executing the processing are stored and a RAM 313 in which the processed data is stored. The CPU 311, the ROM 312 and the RAM 313 are interconnected via a data bus 310a provided in the data processor 310.

Furthermore, the data bus 310a is also connected to a data input device 321 for inputting a signal for switching a failure mode and a normal operation mode or the like and to a display device 330 for displaying the display data. Herein, the data input device 321 is realized by the functions of the tablet and the touch pen 302b of the small-sized electronic unit 301 and the display device 330 is realized by the functions of the liquid crystal display panel of the small-sized electronic unit 301.

In the RAM 313, a database corresponding to the all-object ID table 230a of the navigator apparatus of the second example has been formed. On the other hand, in the CPU 311, a configuration corresponding to the display controller 210 of the navigator apparatus of the second example has been formed.

In this case, an object to be displayed is a product displayed in a sale space of a department store or the like. The basic data of the object are the geometric data and the attributive data specifying the product. For example, the display control data of the object is the data indicating how much detail has been given about the product (hereinafter, such data will be referred to as "detail data") and the function data associating the position of the view point with the time of the day in a predetermined manner.

Specifically, assuming that the detail data of the product is represented by the intensity value ρ and the position of the view point and the time of the day correspond to the variables x and y, respectively, then the function may be given by the following Equation 27:

$$\rho = f(x, y) \quad (27)$$

Therefore, assuming that the product for sale is a perishable food, when a shop assistant or a consumer is carrying the small-sized electronic unit for providing the information about a product and is located rather far away from the perishable food sale space, the image and the name of the food are displayed as the information about the food on the display screen of the electronic unit. As the shop assistant or the consumer comes closer to the food sale space, the information about the food becomes more and more specific. For example, various details about the price, the brand, the arrival day, the place at production and the like are sequentially displayed on the display screen following the order depending upon the degree of the consumer's interest.

As is apparent from the foregoing description, the multi-media data display device of the present invention defines the visual appearance of an individual one of the objects included within the display object area (or view area) where a plurality of objects exist by a continuous function with respect to the positional coordinates determining the view area, thereby independently and continuously controlling the display of an individual object.

For example, as to less important objects within the view area, the size of the objects are made smaller and the color depth thereof are made lighter as the objects become distant from the view point position. On the other hand, with respect to more important objects within the view area, even when the objects are distant from the view point position, the shrinkage rate of the display size can be made lower than that of the unimportant ones and the color depth of such objects can be made constant.

In this way, by providing such display style control information for the objects displayed as multi-media data items, an effective display control is realized and the display styles of an individual object can be independently controlled in accordance with the position in the three-dimensional space, the time and the weather. As a result, the objects can be advantageously displayed more flexibly by displaying a plurality of overlapped objects or by freely varying the display attributes such the color and the transparency of the objects and the display time zone of the objects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multi-media data display device for displaying a plurality of multi-media data items on a display screen, each of the multi-media data items having geometric data and attributive data defined by positional information in an n-dimensional space, comprising:

view area setting means for setting a view area from a multi-media data space, in which the plurality of multi-media data items exist, based on data access position information having a predetermined dimension, the view area having been selected as including at least one of the plurality of multi-media data items as an object to be displayed, the data access position information having been produced within the multi-media data display device or provided from outside of the multi-media data display device; and display control means for independently controlling, based on the data access position information and the n-dimensional space positional information, a display style of an individual one of the plurality of multi-media data items existing within the selected view area, when the individual multi-media data item is displayed on the display screen.

2. A multi-media data display device for displaying a plurality of solid-state objects on a display screen based on basic component data specifying the objects, comprising:

a database for storing display control data setting a display style of an individual one of the objects on the display screen, as well as the basic components data of the object;

view area setting means for setting a view area from an object space, in which the plurality of objects exist, based on data access position information having a predetermined dimension, the view area having been selected as including at least one of the plurality of objects to be displayed, the data access position information having been produced within the multi-media data display device or provided from the outside of the multi-media data display device; and data calculating means for calculating display style data, representing the display style of the individual one of the objects existing within the selected view area, from a display style data position to be determined by the data access position information in a one-dimensional or multi-dimensional display style data space where the display style data exists, based on positional coordinates in an n-dimensional space and function data used as display control data for defining a correspondence between the display style data position and the display style data, wherein the display style of the individual object, existing within the view area, on the display screen is independently controlled in accordance with the data access position information.

3. A multi-media data display device according to claim 2, wherein the display style of the individual object is set by a plurality of factors including a display size and a display color depth of the object displayed on the display screen, the display style data is defined for each of the plurality of factors in a display style data space provided for each of the factors, the display style data space each includes: respective dimensions of the object space where the objects exist; a dimension corresponding to a direction vector in the object space; and dimensions respectively corresponding to a time, a temperature and a humidity, and the display control data is comprised of a number of function data for defining a relationship between the display style data corresponding to the plurality of factors setting the display style of the object and the position of the display style data in the display style data space, the number of the function data corresponding to the number of the factors.

4. A multi-media data display device according to claim 3, wherein the data access position information includes a data access vector providing directional information of the individual object in the object space, the data calculation means calculates display data representing the individual object based on the display style data, the display data is defined by a display transformation function using, as a first variable, a display parameter which is a constant value specific to the individual object and, as a second variable, a scale factor which is a product of the display style data corresponding to the factors and an intensity constant indicating to what degree the display style data is affected on the display screen, and the intensity constant is defined by an intensity factor function using, as a variable, an inner product of an intensity normal vector indicating a dependence direction of the display style data and the data access vector in the object space, the intensity normal vector being defined for the individual object by an intensity normal vector transformation function using the display style data position in the display style data space as a variable.

5. A multi-media data display device for displaying a plurality of multi-media data items on a display screen, each of the multi-media data items having geometric data and attributive data defined by positional information in an n-dimensional space, comprising:

view area setting processing circuitry configured to set a view area from a multi-media data space, in which the plurality of multi-media data items exist, based on data access position information having a predetermined dimension, the view area having been selected as including at least one of the plurality of multi-media data items as an object to be displayed, the data access position information having been produced within the multi-media data display device or provided from outside of the multi-media data display device; and a display controller for independently controlling, based on the data access position information and the n-dimensional space positional information, a display style of an individual one of the plurality of multi-media data items existing within the selected view area, when the individual multi-media data item is displayed on the display screen.

6. A multi-media data display device for displaying a plurality of solid-state objects on a display screen based on basic component data specifying the objects, comprising:

a database for storing display control data setting a display style of an individual one of the objects on the display screen, as well as the basic components data of the object;

view area setting processing circuitry configured to set a view area from an object space, in which the plurality of objects exist, based on data access position information having a predetermined dimension, the view area having been selected as including at least one of the plurality of objects to be displayed, the data access position information having been produced within the multi-media data display device or provided from the outside of the multi-media data display device; and a processor for calculating display style data, representing the display style of the individual one of the objects existing within the selected view area, from a display style data position to be determined by the data access position information in a one-dimensional or multi-dimensional display style data space where the display style data exists, based on positional coordinates in an n-dimensional space and function data used as display control data for defining a correspondence between the display style data position and the display style data, wherein the display style of the individual object, existing within the view area, on the display screen is independently controlled in accordance with the data access position information.

* * * * *